(12) United States Patent
Pant et al.

(10) Patent No.: US 10,317,968 B2
(45) Date of Patent: Jun. 11, 2019

(54) POWER MULTIPLEXING WITH AN ACTIVE LOAD

(71) Applicant: QUALCOMM Incorporated

(72) Inventors: Harshat Pant, San Diego, CA (US); Rajeev Jain, San Diego, CA (US); Sassan Shahrokhinia, San Diego, CA (US); Lam Ho, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 15/471,692

(22) Filed: Mar. 28, 2017

(65) Prior Publication Data

US 2018/0284859 A1  Oct. 4, 2018

(51) Int. Cl.
*G06F 1/26* (2006.01)
*H02J 1/08* (2006.01)
*H02J 1/10* (2006.01)

(52) U.S. Cl.
CPC ............. *G06F 1/263* (2013.01); *H02J 1/08* (2013.01); *H02J 1/108* (2013.01)

(58) Field of Classification Search
CPC ...................................................... G06F 1/26
See application file for complete search history.

(56) References Cited

U.S. PATENT DOCUMENTS

| 8,015,419 B2 | 9/2011 | Rowhani et al. |
| 8,125,501 B2 | 2/2012 | Amundson et al. |
| 8,896,147 B2 | 11/2014 | Mangattur et al. |
| 2010/0164292 A1* | 7/2010 | Freeman ................. G06F 1/263 307/80 |
| 2011/0018347 A1* | 1/2011 | Noda .................... H02M 3/155 307/43 |

(Continued)

FOREIGN PATENT DOCUMENTS

| WO | 2016168695 A1 | 10/2016 |
| WO | 2017019160 A1 | 2/2017 |

OTHER PUBLICATIONS

International Search Report and Written Opinion—PCT/US2018/017281—ISA/EPO—Mar. 22, 2018.

*Primary Examiner* — Kim Huynh
*Assistant Examiner* — Kevin M Stewart
(74) *Attorney, Agent, or Firm* — Colby Nipper/Qualcomm

(57) ABSTRACT

An integrated circuit is disclosed for power multiplexing with an active load. In an example aspect, the integrated circuit includes a first power rail, a second power rail, a load power rail, multiple power-multiplexer tiles, and power-multiplexer control circuitry. The first power rail is at a first voltage, and the second power rail is at a second voltage. The multiple power-multiplexer tiles are coupled in series in a chained arrangement and jointly perform a power-multiplexing operation responsive to a power-rail switching signal. Each power-multiplexer tile switches between coupling the load power rail to the first power rail and the second power rail. The power-multiplexer control circuitry is coupled to the first and second power rails and includes a comparator to produce a relative voltage signal based on the first and second voltages. The power-multiplexer control circuitry generates the power-rail switching signal based on the relative voltage signal.

30 Claims, 17 Drawing Sheets

(56) References Cited

U.S. PATENT DOCUMENTS

| | | | |
|---|---|---|---|
| 2012/0320632 A1* | 12/2012 | Kalodka | H02M 3/33507 363/16 |
| 2013/0293013 A1* | 11/2013 | Templeton | H02J 1/10 307/64 |
| 2013/0313904 A1* | 11/2013 | Kayama | H02J 1/00 307/26 |
| 2013/0332748 A1* | 12/2013 | Kolla | G06F 1/26 713/300 |
| 2014/0285014 A1 | 9/2014 | Calhoun et al. | |
| 2015/0200541 A1 | 7/2015 | Gorla et al. | |
| 2016/0109932 A1* | 4/2016 | Jeon | G06F 1/3296 713/323 |
| 2016/0134159 A1* | 5/2016 | Umeyama | H03K 3/012 307/64 |
| 2016/0308372 A1 | 10/2016 | Kolla et al. | |

* cited by examiner

POWER MULTIPLEXING WITH AN ACTIVE LOAD

TECHNICAL FIELD

This disclosure relates generally to power management with integrated circuits (ICs) that are used in electronic devices and, more specifically, to enabling a circuit load to continue active operations while the circuit load is switched from one power rail to another power rail.

BACKGROUND

Power consumption by electronic devices is an increasingly important factor in the design of electronic devices. From a global perspective, the energy consumption of electronic devices occupies a sizable percentage of total energy usage due to large corporate data centers and the ubiquity of personal computing devices. Environmental concerns thus motivate efforts to reduce the power consumed by electronic devices to help conserve the earth's resources. From an individual perspective, less power consumption translates to lower energy bills. Furthermore, many personal computing devices are portable and powered by batteries. The less energy that is consumed by a portable battery-powered electronic device, the longer the portable device may operate without recharging the battery. Lower energy consumption also enables the use of smaller batteries and the adoption of thinner form factors, which means electronic devices can be made more portable or versatile. Thus, the popularity of portable devices also motivates efforts to reduce the power consumption of electronic devices.

An electronic device consumes power if the device is coupled to a power source and is turned on. This is true for the entire electronic device, but it is also true for individual parts of the electronic device. Hence, power consumption can be reduced if parts of an electronic device are powered down, even while other parts remain powered up. Entire discrete components of an electronic device, such as a whole integrated circuit (IC) or a Wi-Fi radio, may be powered down. Alternatively, selected parts of a discrete component may likewise be powered down. For example, a distinct processing entity or a circuit block of an integrated circuit chip, such as a core thereof, may be selectively powered down for some period of time to reduce energy consumption.

A portion of an integrated circuit, such as a core, can therefore be powered down to reduce power usage and extend battery life. A core can be powered down by decoupling the core from a power source or by turning the power source off. Additionally, a core can be powered down by lowering a voltage supplied to the core to reduce power consumption. One approach to supplying a lower voltage level to a core of an integrated circuit is called dynamic voltage scaling (DVS). With dynamic voltage scaling, energy usage by a core can be managed by lowering a supply voltage during times of reduced utilization and then raising the supply voltage at other times to meet higher utilization demands.

Thus, using dynamic voltage scaling as a power management technique with integrated circuits can reduce the power consumption of electronic devices. Unfortunately, implementing dynamic voltage scaling is challenging. For example, implementing dynamic voltage scaling can adversely impact a performance level of a core of an integrated circuit, especially during the voltage level transitions. During a voltage level transition, processing throughput for a core can be slowed, and data can be corrupted. These concerns have hindered the deployment of dynamic voltage scaling and consequently prevented the full power-conserving benefits of dynamic voltage scaling from being attained.

SUMMARY

An integrated circuit is disclosed that enables power multiplexing with an active load. In an example aspect, the integrated circuit includes a first power rail, a second power rail, and a load power rail. The first power rail is configured to be held at a first voltage, and the second power rail is configured to be held at a second voltage. The integrated circuit also includes multiple power-multiplexer tiles coupled in series in a chained arrangement. The multiple power-multiplexer tiles are configured to jointly perform a power-multiplexing operation responsive to a power-rail switching signal. Each power multiplexer tile is configured to switch between coupling the load power rail to the first power rail and coupling the load power rail to the second power rail. The integrated circuit further includes power-multiplexer control circuitry coupled to the first power rail and the second power rail. The power-multiplexer control circuitry includes a comparator that is configured to produce a relative voltage signal based on the first voltage and the second voltage. The power-multiplexer control circuitry is configured to generate the power-rail switching signal based on the relative voltage signal.

In an example aspect, an integrated circuit is disclosed. The integrated circuit includes a first power rail that is configured to be held at a first voltage, and a second power rail that is configured to be held at a second voltage. The integrated circuit also includes a load power rail and a circuit load that is coupled to the load power rail. The integrated circuit further includes multiple power-multiplexer tiles that are coupled in series in a chained arrangement. The multiple power-multiplexer tiles are configured to jointly perform a power-multiplexing operation responsive to a power-rail switching signal. Each power-multiplexer tile is configured to switch between coupling the load power rail to the first power rail and coupling the load power rail to the second power rail. The integrated circuit additionally includes power-multiplexer control circuitry that is coupled to the first power rail and the second power rail. The power-multiplexer control circuitry includes comparison means for producing a relative voltage signal based on the first voltage and the second voltage and initiation means for generating the power-rail switching signal based on the relative voltage signal.

In an example aspect, a method for power multiplexing with an active load is disclosed. The method includes supplying power to a load power rail using a first power rail. The method also includes comparing a first voltage of the first power rail to a second voltage of a second power rail and generating a relative voltage signal based on the comparing. A voltage-level indication signal indicative of an issuance of a command to change the second voltage of the second power rail is obtained. The method further includes generating a power-rail switching signal based on the relative voltage signal and the voltage-level indication signal and performing a power-multiplexing operation to disconnect from the first power rail and to connect to the second power rail based on the power-rail switching signal. The method additionally includes supplying power to the load power rail using the second power rail.

In an example aspect, an integrated circuit is disclosed. The integrated circuit includes a first power rail, a second power rail, and a load power rail. The first power rail is configured to be held at a first voltage, and the second power rail is configured to be held at a second voltage. The integrated circuit also includes multiple power-multiplexer tiles coupled between the first power rail and the load power rail and between the second power rail and load power rail. The multiple power-multiplexer tiles are configured to switch between coupling the load power rail to the first power rail and coupling the load power rail to the second power rail based on a power-rail switching signal. The integrated circuit further includes power-multiplexer control circuitry that is coupled to the first power rail and the second power rail and is configured to generate the power-rail switching signal based on at least one trigger signal. The power-multiplexer control circuitry includes power-multiplexer triggering circuitry that is configured to generate the at least one trigger signal responsive to a second voltage level of the second voltage crossing a first voltage level of the first voltage.

BRIEF DESCRIPTION OF DRAWINGS

FIG. 7-1 illustrates an example of power-multiplexer initiation circuitry to generate a power-rail switching signal based on a trigger signal.

FIG. 7-2 illustrates another example of power-multiplexer initiation circuitry to generate a power-rail switching signal based on a trigger signal.

FIG. 7-3 illustrates yet another example of power-multiplexer initiation circuitry to generate a power-rail switching signal based on a trigger signal.

FIG. 11-1 illustrates an example of a power-multiplexing control signaling interface for transistors realizing the first and second switching circuits that are controlled by a power-rail switching signal in accordance with that of FIG. 7-1.

FIG. 11-2 illustrates an example of a power-multiplexing control signaling interface for transistors realizing the first and second switching circuits that are controlled by a power-rail switching signal in accordance with that of FIG. 7-2.

FIG. 11-3 illustrates an example of a power-multiplexing control signaling interface for transistors realizing the first and second switching circuits that are controlled by a power-rail switching signal in accordance with that of FIG. 7-3.

DETAILED DESCRIPTION

Figure 1:
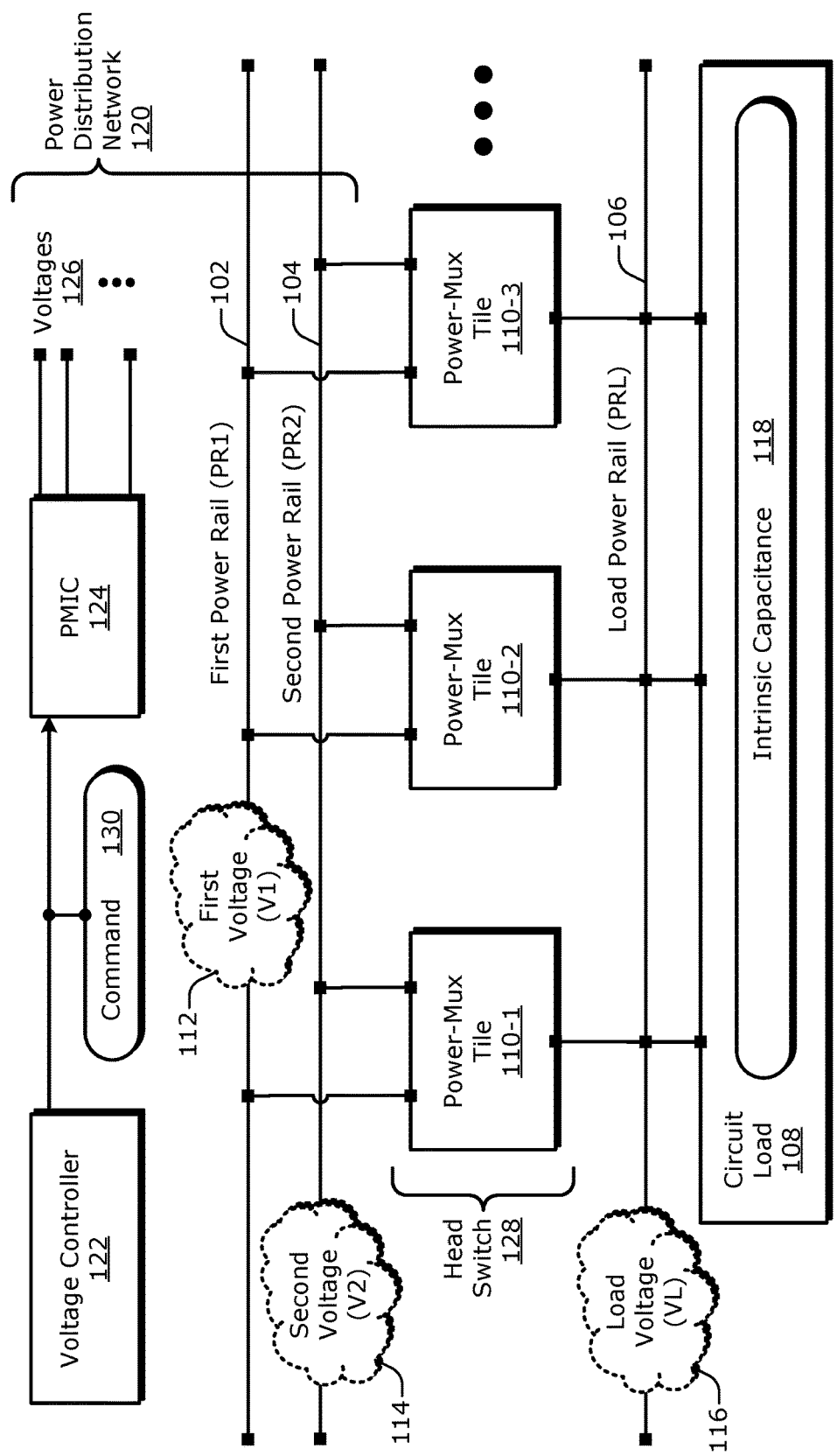
FIG. 1 illustrates an example portion of an integrated circuit that includes multiple power-multiplexer tiles (power-mux tiles) and a circuit load.

Power management of electronic devices entails controlling an amount of energy that an integrated circuit (IC) consumes over time or on an instantaneous basis. Energy consumption can be reduced to zero or near zero during times of nonuse if an integrated circuit is powered down completely. At times of lower utilization or to retain some stored data, an integrated circuit may be powered down to a lower voltage level to reduce power consumption. Also, if an integrated circuit cannot be powered down as a whole, then one or more portions, or cores, may be powered down independently of one another.

An example power management technique is power multiplexing. Power multiplexing may be utilized to provide power reduction opportunities during operation of an integrated circuit. With power multiplexing, an integrated circuit portion, such as a core, is switched from being powered at one voltage level to being powered at another voltage level. Generally, a given core of an integrated circuit consumes less energy if operated at a lower voltage level. Thus, power consumption of an integrated circuit can be reduced by switching a core to a lower voltage level.

In a specific example of power multiplexing, a processor operates in conjunction with a memory that stores data for the processor. The processor is initially operating at a boosted performance level that entails supplying a boosted voltage level to the processor, with the boosted voltage level also being supplied to the memory so that the memory can service the processor's faster-than-normal data requirements. When the utilization of the processor eventually becomes sufficiently low, a core that includes the processor logic may be partially powered down by lowering the supplied voltage level to reduce energy usage. The memory, however, cannot operate at this lowered voltage level while still ensuring that stored data is maintained in the memory. Thus, with the voltage level for the processor being lowered, the memory is to be supplied with a different voltage level. One way to supply a different voltage level for the memory is to use power multiplexing techniques to switch a core including the memory from one power rail held at one voltage level to another power rail held at another voltage level.

In power multiplexing generally, a circuit load is multiplexed between multiple power rails that are being held at multiple different voltage levels. The multiplexing between different power rails is accomplished using one or more power-multiplexer tiles. If two power rails, for example, are involved in the power multiplexing, each power-multiplexer tile includes two switching circuits, such as two switching transistors, with each switching circuit coupled to one of the two power rails. A power-multiplexing operation entails disconnecting the circuit load from one power rail and connecting the circuit load to the other power rail using the two switching transistors in accordance with a carefully-orchestrated switching procedure. If the circuit load occupies a large area of an integrated circuit chip, multiple power-multiplexer tiles are distributed at different physical locations over the chip to meet current-resistance (IR) drop requirements and to deliver power to different areas of the circuit load, as will be appreciated by the skilled artisan.

Employing distributed power-multiplexer tiles does enable switching between two different power rails to change the voltage levels that are supplied to a circuit load and therefore reduce power consumption over a large area of an integrated circuit. Unfortunately, power-multiplexing scenarios involving distributed power-multiplexer tiles introduce a number of competing problems. First, cross-conduction between two different power rails results in an unnecessary expenditure of power that wastes energy. For example, two different switching transistors coupled to two different power rails of arbitrary voltages cannot both be on at the same time without risking the development of a short-circuit current between the two different power rails, especially if the two different switching transistors are close to one another, such as by being part of the same power-multiplexer tile or adjacent power-multiplexer tiles. More specifically, if two switching transistors that are coupled to two different power rails are both turned on, current may flow from a higher-voltage power rail through one of the switching transistors to a common node of a load power rail. From the common node, the current continues by flowing through the other switching transistor to the lower-voltage power rail. A significant amount of power can be drained by a short-circuit current if the short-circuit current condition persists. Moreover, the short-circuit current can be sufficiently strong so as to jeopardize the reliability, or even the viability, of the switching transistors.

With regard to a second competing problem with power-multiplexing operations, the switching transistors of the multiple distributed power-multiplexer tiles that are coupled to the two different power rails cannot all be off simultaneously for an extended period of time. If all of the transistors are simultaneously off, the circuit load no longer receives power. As a result, there is an undesirable voltage drop in the circuit load caused by the load current discharging the intrinsic capacitance of the circuit load. This discharging jeopardizes the retention of any data stored in the circuit load and can harm ongoing processing tasks. Third, if the circuit load is to continue active processing during a power-multiplexing operation, the circuit load continues to rely on oscillations of a periodic clock signal. Disconnecting the circuit load from both power rails is therefore inadvisable because clock pulses cannot be reliably distributed around the circuit load without supplying some amount of power.

Fourth, a power-multiplexing operation can include a disconnection portion pertaining to an origin power rail and a connection portion pertaining to a destination power rail. The connection portion can cause a voltage droop in the destination power rail. Multiple switching transistors are coupled to a given power rail and distributed around a circuit load at multiple power-multiplexer tiles. If all of the multiple switching transistors, or just many of them, are turned on simultaneously, a significant quantity of current suddenly flows into the circuit load from the given power rail. This sudden current flow causes the voltage level on the given power rail to droop. The voltage droop causes other cores that are also coupled to the power rail to function incorrectly.

Handling the multiple issues arising from these four competing problems, especially over a large physical area, is challenging.

These four problems can be restated as a cross-conduction concern due to a potential short-circuit current condition (the first problem), a non-conduction concern due to a desire to keep the circuit load functionality viable during and after the power-multiplexing operation (the second and third problems), and an over-conduction concern due to a potential current in-rush situation (the fourth problem). To at least partially address these problems, a power-multiplexing operation can involve a power rail transition procedure having multiple phases that uses diode-connected transistors. The power rail transition procedure entails switching a circuit load from an origin power rail to a destination power rail. Associated power-multiplexer control circuitry includes a capability to control a direction of current flow during the power-multiplexing operation using the diode-connected transistors. Accordingly, the power-multiplexer control circuitry institutes an overlapping phase during the power rail transition procedure in which a circuit load can receive power simultaneously from multiple power rails without risking an appreciable cross-conduction current and thereby enable a continuous provision of power. Additionally, another phase includes a sequential switching along a chain of power-multiplexer tiles to gradually draw an increasing amount of current from a destination power rail to manage current in-rush.

Each power-multiplexer tile includes at least one switching circuit that can be placed in a current-flow mode selected from an off mode, an on mode, and a one-way mode using a diode-connected transistor. The switching circuit bi-directionally blocks current flow in the off mode and bi-directionally enables current flow in the on mode. In the one-way mode, the switching circuit permits unidirectional current flow but prevents bi-directional current flow using the diode-connected transistor. To prevent an appreciable short-circuit current condition between two different power rails, a direction of current flow is controlled by selectively activating the one-way current-flow mode of a corresponding switching circuit during a power-multiplexing operation.

For two power rails, the power-multiplexer tile includes first and second switching circuits. The first switching circuit and the second switching circuit can simultaneously permit a current to flow to address the non-conduction concern. During this time, the power-multiplexer tile places one of the two switching circuits in the one-way mode to prevent a current flow toward the corresponding power rail to which the switching circuit is coupled so as to address the cross-conduction concern. For example, the power-multiplexer tile places the switching circuit that is coupled to the power rail having the lower voltage level in the one-way current-flow mode to prevent current from flowing toward the lower voltage power rail.

Each switching circuit can include a big switch and a little switch coupled in parallel. The little switch is realized operationally as a diode-type device using a transistor that is selectively connectable in a diode configuration. If a switching circuit is coupled to a lower voltage power rail, the little switch can be activated as a diode while the big switch is switched off to place the switching circuit in a one-way mode that permits unidirectional current flow. The little switches of the switching circuits, which are disposed across multiple power-multiplexer tiles, are placed in an on state or in a one-way state in a sequential manner to provide power gradually along the circuit load during the power rail transition procedure. This sequential activation of the on or one-way state along multiple power-multiplexer tiles addresses the potential current in-rush concern as the circuit load absorbs increasing amounts of current from the destination power rail during the sequential activation. After the little switches have entered the on state for a destination power rail, the power-multiplexing control circuitry turns on the big switches for the destination power rail to enable a greater current to flow into the circuit load for ongoing power delivery.

This diode-based approach can facilitate the performance of power-multiplexing operations for environments in which, for example, power rails are held at different voltage levels. However, this diode-based approach takes several passes across the chain of power-multiplexer tiles to activate the switching circuits into different states to address the competing problems listed above. Making multiple passes takes time. The circuitry to orchestrate the multiple passes, as well as the diode-connected transistors, involve additional circuitry. Further, to ensure that the circuit load is not subject to a possible malfunction during the power-multiplexing operation, the periodic clock to the circuit load is gated as the multiple phases are implemented. Because the clock is being gated and processing is therefore being paused, the power-multiplexing operation is initiated by software by writing a value into a hardware register. These various complications can be mitigated in certain environments as described herein.

Thus, the diode-based approach described above is applicable to integrated circuit environments in which power rails are held at voltage levels that remain different from each other. In contrast, approaches described herein below pertain to integrated circuit environments in which one voltage of one power rail passes another voltage of another power rail. A power-multiplexing operation is initiated responsive to detection that one voltage level is crossing the other voltage level, and the power-multiplexing operation is performed while the two voltage levels are substantially similar. Consequently, the potential for a significant short-circuit current condition to develop is reduced inasmuch as one voltage level is not substantially different from the other voltage level. Further, because the voltage level being supplied to the load circuit is not being significantly changed by the power-multiplexing operation, an oscillating periodic clock signal can be continuously provided to the circuit load. Thus, the circuit load can continue active operation during the power-multiplexing operation. Hardware can therefore perform the power-multiplexing operation in a manner that is transparent to software, and mandatory involvement by the software can be obviated. Additionally, control circuitry is simplified as the power-multiplexing operation can be performed in a single pass across a chain of power-multiplexer tiles.

In one or more example implementations, multiple power-multiplexer tiles that are arranged in a chain are distributed along at least one side of a circuit load. The circuit load is coupled to a load power rail. The multiple power-multiplexer tiles can multiplex the circuit load to different supply power rails, which are normally held at different voltage levels, while at least one supply power rail is transitioning between two steady voltage levels. Power-multiplexer control circuitry and the multiple power-multiplexer tiles jointly perform a power-multiplexing operation based on a power-rail switching signal that is provided to an initial power-multiplexer tile and is propagated between consecutive power-multiplexer tiles along the chain in a single pass. The following description explains example principles in terms of two supply power rails—a first power rail and a second power rail. However, the described principles are also applicable to integrated circuits having three or more supply power rails.

The first power rail is held at a first voltage, and the second power rail is held at a second voltage. The multiple power-multiplexer tiles are coupled between the first and second power rails and the load power rail. The power-multiplexer control circuitry includes a comparator to detect if one power rail has a changing voltage level that crosses another voltage level of another power rail. The comparator produces a relative voltage signal based on a comparison including the first voltage and the second voltage. A change in the value of the relative voltage signal is indicative that a first voltage level has crossed a second voltage level because at least one of the first voltage or the second voltage is changing. The power-multiplexer control circuitry generates the power-rail switching signal based on the relative voltage signal.

However, voltage noise or other power distribution network issues can cause a change in voltage levels of the supply power rails that inadvertently produce a change in the value of the relative voltage signal. In other words, a change of the relative voltage signal may be spurious. To increase the certainty of a determination that a voltage level on a supply power rail is changing intentionally, the power-multiplexer control circuitry generates the power-rail switching signal based also on a voltage-level indication signal. A voltage controller provides the voltage-level indication signal, which is indicative that the voltage controller has issued a command to change a voltage level on a supply power rail. The voltage controller can issue such a command to, for example, a power management integrated circuit (PMIC) that holds supply power rails to particular voltages. The power-multiplexer control circuitry initiates a power-multiplexing operation by providing the power-rail switching signal to the chained arrangement of power-multiplexer tiles.

Each power-multiplexer tile of the multiple power-multiplexer tiles includes a first switching circuit coupled between the first power rail and the load power rail and a second switching circuit coupled between the second power rail and the load power rail. Each power-multiplexer tile also includes tile control circuitry to control operation of the first switching circuit and the second switching circuit in a single pass along the chained arrangement of power-multiplexer tiles. During the single pass along the chain, at each power-multiplexer tile, one switching circuit disconnects from one supply power rail, and the other switching circuit connects to the other supply power rail.

In these manners, the four problems set forth above are addressed and at least partially ameliorated for situations in which at least one changing voltage level crosses another voltage level. At least one of the first switching circuit or the second switching circuit across the chained arrangement of multiple power-multiplexer tiles can be continuously providing power during the power-multiplexing operation. This enables the circuit load to continue to correctly operate, including if a periodic clock signal is applied to the circuit load, while performing active operations during the power-multiplexing operation. To counteract a potential voltage droop on a destination power rail, current in-rush is managed by sequentially activating switching circuits that are coupled to the destination power rail along the chained series of power-multiplexer tiles during a single pass.

FIG. 1 illustrates an example portion of an integrated circuit 100 that includes multiple power-multiplexer tiles 110-1 to 110-3, or multiple power-mux tiles, and a circuit load 108. As shown, the integrated circuit 100 includes three power rails: a first power rail 102 (PR1), a second power rail 104 (PR2), and a load power rail 106 (PRL). The integrated circuit 100 also includes the circuit load 108, an intrinsic capacitance 118, and a power distribution network 120 (PDN). In addition to the power rails, the power distribution network 120 can include a voltage controller 122 or a power management integrated circuit 124 (PMIC). Although the integrated circuit 100 is illustrated as including three power-multiplexer tiles 110-1, 110-2, and 110-3, more or fewer may alternatively be implemented for a power-multiplexing operation.

The circuit load 108 may correspond to a core, or circuit block, of the integrated circuit 100. Examples for the circuit load 108 include memory, a processor, a group of retention flip-flops (RFFs), or some combination thereof. The intrinsic capacitance 118 represents capacitive effects resulting from an architecture or a material used to construct the circuit devices of the circuit load 108. For example, metal lines and transistors typically have or generate an intrinsic capacitance. Although the intrinsic capacitance 118 is illustrated as a monolithic block in FIG. 1, the intrinsic capacitance 118 is actually distributed over the circuit devices spanning the area across the circuit load 108.

The power management integrated circuit 124 is implemented as a voltage source to supply voltages 126 to power rails at specified voltage levels through voltage conversion or regulation. The power management integrated circuit 124 holds the first power rail 102 and the second power rail 104 at different voltages as per the on-chip voltages 126. One or more supply power rails form at least part of the power distribution network 120 that distributes power to different locations and various circuitry around the integrated circuit 100. The power distribution network 120 may include the voltage controller 122 or the power management integrated circuit 124.

The voltage controller 122 issues commands 130 to the power management integrated circuit 124. Each command 130 instructs the power management integrated circuit 124 to change, such as establish or adjust, one of the voltages 126. The voltage controller 122 or the power management integrated circuit 124 can be part of or separate from the integrated circuit 100. In other words, the voltage controller 122 or the power management integrated circuit 124 may be on the same or a different integrated circuit chip.

The multiple power-multiplexer tiles 110-1 to 110-3 can function as a switch to provide power to the circuit load 108. As shown, the multiple power-multiplexer tiles 110-1 to 110-3 form a head switch 128. Generally, a head switch is connected between a supply power rail that is serving as a voltage source and a circuit load that is performing digital processing to provide some functionality. For the integrated circuit 100, the head switch 128 is connected between the first power rail 102 and the circuit load 108 and between the second power rail 104 and the circuit load 108. The head switch 128 can be implemented using, for example, p-channel or p-type metal-oxide-semiconductor (PMOS) devices that are formed with n-well or n-substrate technology, such as a p-type field effect transistor (PFET). The head switch 128 may be realized as a globally distributed head switch (GDHS) or as a block head switch (BHS).

The head switch 128 includes multiple power-multiplexer tiles 110-1 to 110-3. Specifically, three power-multiplexer tiles 110-1, 110-2, and 110-3 are shown distributed along the circuit load 108. However, the head switch 128 may include a different number of power-multiplexer tiles 110. Multiple power-multiplexer tiles 110-1 to 110-3 are disposed at least partially around the circuit load 108 in a particular layout, such as along one side or along two or more sides of the circuit load 108, to facilitate providing power evenly across the circuit load 108. However, other power-multiplexer tile layouts may alternatively be implemented. Further, although not so illustrated in FIG. 1, the multiple power-multiplexer tiles 110-1 to 110-3 may alternatively be implemented as part of a foot switch.

The first power rail 102 and the second power rail 104 are both coupled to each power-multiplexer tile 110. Each power-multiplexer tile 110 is further coupled to the load power rail 106, and the load power rail 106 is coupled to the circuit load 108. For the integrated circuit 100, the first power rail 102 and the second power rail 104 are configured to supply power to the load power rail 106 and thus to the circuit load 108 via the head switch 128 using the multiple power-multiplexer tiles 110-1 to 110-3. In operation, each power-multiplexer tile 110 is configured to switch from using the first power rail 102 to using the second power rail 104, and vice versa, to supply power to the circuit load 108 via the load power rail 106.

The first power rail 102 is held at a first voltage 112 (V1), and the second power rail 104 is held at a second voltage 114 (V2). The power management integrated circuit 124 maintains the first voltage 112 on the first power rail 102 and the second voltage 114 on the second power rail 104. Alternatively, first and second power supplies or power regulators (not shown) can maintain the first voltage 112 on the first power rail 102 and the second voltage 114 on the second power rail 104. The load power rail 106 can be held at a load voltage 116 (VL). For example, if one or more of the power-multiplexer tiles 110-1 to 110-3 connect the first power rail 102 to the load power rail 106, the load power rail 106 can be held at the first voltage 112, and if one or more power-multiplexer tiles 110-1 to 110-3 connect the second power rail 104 to the load power rail 106, the load power rail 106 can be held at the second voltage 114. Thus, each power-multiplexer tile 110 switches from providing the first voltage 112 as the load voltage 116 to providing the second voltage 114 as the load voltage 116. An arrangement of multiple power-multiplexer tiles, along with power-multiplexer control circuitry and power-multiplexer control signals, is shown in FIG. 2.

Figure 2:
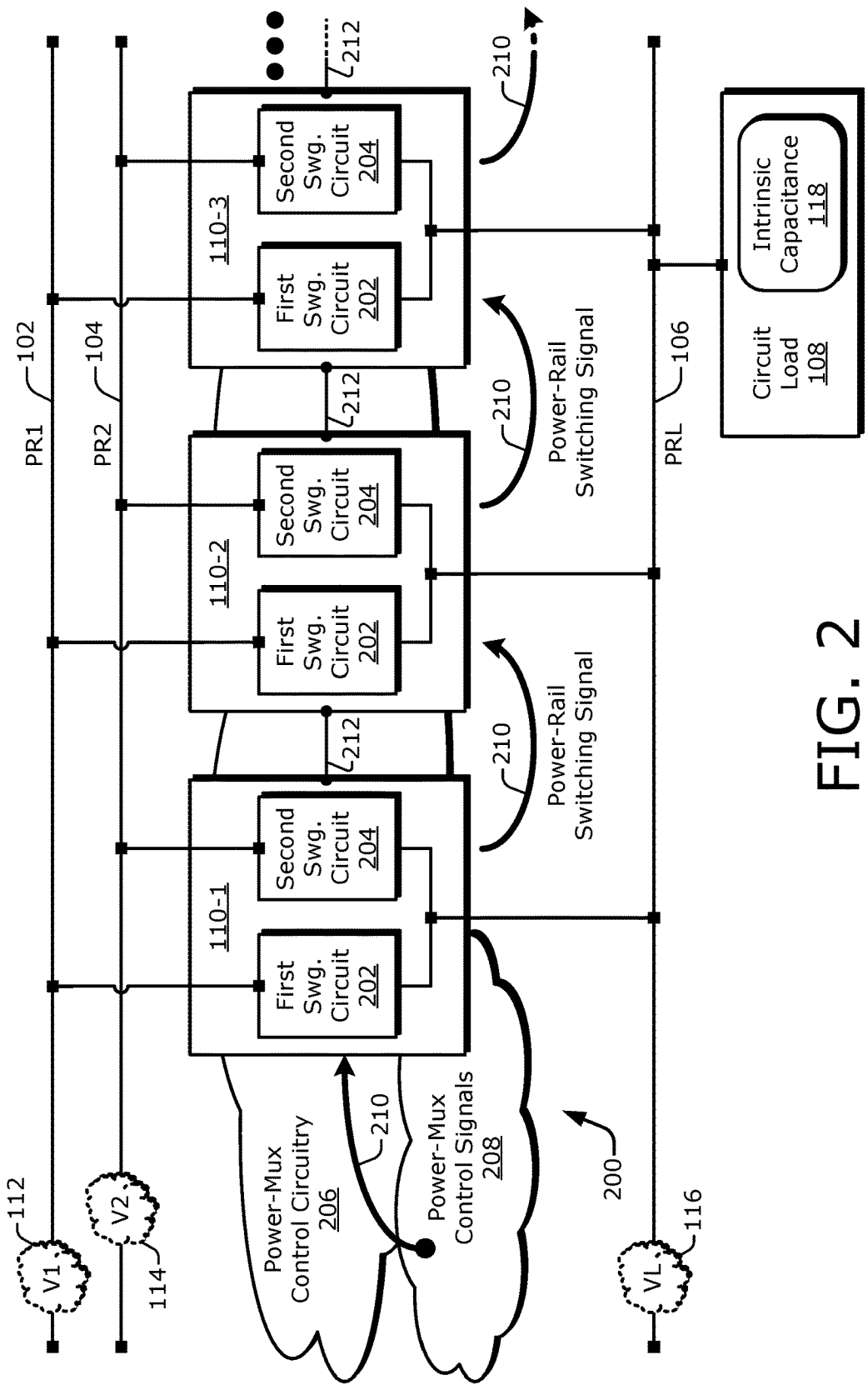
FIG. 2 illustrates an example chained arrangement of multiple power-multiplexer tiles, each of which includes first and second switching circuits coupled to two power rails, in conjunction with power-multiplexer control circuitry.

FIG. 2 illustrates an example chained arrangement 200 of multiple power-multiplexer tiles 110-1 to 110-3, which each include first and second switching circuits coupled to power rails, in conjunction with power-multiplexer control circuitry 206. FIG. 2 also depicts the first power rail 102 along with the first voltage 112, the second power rail 104 along with the second voltage 114, the load power rail 106 along with the load voltage 116, and the circuit load 108 along with the intrinsic capacitance 118. As compared to FIG. 1, FIG. 2 adds power-multiplexer control circuitry 206 (power-mux control circuitry), power-multiplexer control signals 208 (power-mux control signals), a power-rail switching signal 210, and inter-tile signal propagation circuitry 212. Each power-multiplexer tile 110 includes a first switching circuit 202 and a second switching circuit 204.

In example implementations having a chained arrangement 200, the multiple power-multiplexer tiles 110-1 to 110-3 are coupled in series, at least from a perspective of control signal propagation. The first power-multiplexer tile in the series, the power-multiplexer tile 110-1, is called the "initial" power-multiplexer tile herein. As shown, each of the power-multiplexer tiles 110-1 to 110-3 is coupled to both the first power rail 102 and the second power rail 104 via the switching circuits. Each of the power-multiplexer tiles 110-1 to 110-3 is also coupled to the load power rail 106 via the switching circuits. Specifically, each first switching circuit 202 is coupled between the first power rail 102 and the load power rail 106, and each second switching circuit 204 is coupled between the second power rail 104 and the load power rail 106.

The power-multiplexer control circuitry 206 and the power-multiplexer control signals 208 are depicted as cloud shapes to represent that the circuitry and the signals, respectively, are distributed across the multiple power-multiplexer tiles 110-1, 110-2, and 110-3. A portion of the power-multiplexer control circuitry 206 may be disposed internal to each power-multiplexer tile 110. Additionally or alternatively, a portion of the power-multiplexer control circuitry 206 can be disposed external to the multiple power-multiplexer tiles 110-1 to 110-3, including between or among the multiple power-multiplexer tiles 110-1 to 110-3 to propagate one or more signals of the power-multiplexer control signals 208. Examples aspects of the power-multiplexer control circuitry 206 and the power-multiplexer control signals 208 are described with reference to FIGS. 4-6.

In an example operation, the power-multiplexer control circuitry 206 causes the multiple power-multiplexer tiles 110-1 to 110-3 to switch from an origin power rail to a destination power rail to perform a power-multiplexing operation. For instance, the power-multiplexer control circuitry 206 can cause the power-multiplexer tiles 110-1 to 110-3 to switch from coupling the load power rail 106 to the first power rail 102 to coupling the load power rail 106 to the second power rail 104, or vice versa. Generally, this power source switching can be performed sequentially in a single pass along the chained arrangement 200 in an order that starts from the "initial" power-multiplexer tile 110-1, continues to the third power-multiplexer tile 110-3, and then continues to a "terminal" power-multiplexer tile 110 (not explicitly shown). To do so, one switching circuit is closed and the other switching circuit is opened in each power-multiplexer tile 110. If the switching circuits are implemented using one or more transistors, a transistor that is turned off corresponds to an open switch that blocks current flow, and a transistor that is turned on corresponds to a closed switch that enables current flow.

The power-rail switching for the power-multiplexing operation is performed sequentially from one power-multiplexer tile 110 to a consecutive power-multiplexer tile 110 along the chained arrangement 200. The thick solid arrows indicate a sequential progression of the power-rail switching signal 210 starting from the initial power-multiplexer tile 110-1 and continuing from left-to-right. More generally, the power-multiplexer control circuitry 206 implements a power rail transition procedure based on one voltage level of one power rail crossing another voltage level of another power rail as described herein. Although two supply power rails are depicted in FIG. 2, power-multiplexing operations that are described herein are also applicable to integrated circuits with power distribution networks having three or more supply power rails (e.g., a first power rail, a second power rail, and a third power rail).

In some implementations, each of the first switching circuit 202 and the second switching circuit 204 is capable of being in an open state or a closed state. In the open state, a switching circuit blocks current flow. In the closed state, the switching circuit enables current flow. If the circuit load 108 is being powered by the first power rail 102, the multiple first switching circuits 202 are in the closed state, and the multiple second switching circuits 204 are in the open state. On the other hand, if the circuit load 108 is being powered by the second power rail 104, the multiple first switching circuits 202 are in the open state, and the multiple second switching circuits 204 are in the closed state. The first switching circuits 202 and the second switching circuits 204 enable the power-multiplexer control circuitry 206 to establish which supply power rail is coupled to the load power rail 106.

In an example power-rail-switching scenario, assume that the circuit load 108 is being powered by the first power rail 102 and that the power-multiplexer control circuitry 206 is managing a power-multiplexing operation to switch power rails such that the circuit load 108 is to be powered by the second power rail 104. Thus, at the beginning of this scenario, the multiple first switching circuits 202 are in the closed state, and the multiple second switching circuits 204 are in the open state. Initially, the first voltage 112 of the first power rail 102 and the second voltage 114 of the second power rail 104 are at different, unchanging voltage levels. Here, in this example, the first voltage 112 is initially greater than the second voltage 114. Then the power-multiplexer control circuitry 206 detects that the second voltage 114 is changing. Responsive to the second voltage 114 crossing the first voltage 112, the power-multiplexer control circuitry 206 generates the power-rail switching signal 210 to initiate the power-multiplexing operation.

Responsive to receipt of the power-rail switching signal 210, the initial power-multiplexer tile 110-1 switches the first switching circuit 202 from the closed state to the open state and the second switching circuit 204 from the open state to the closed state. Thus, the initial power-multiplexer tile 110-1 disconnects the load power rail 106 from the first power rail 102 and connects the load power rail 106 to the second power rail 104. The initial power-multiplexer tile 110-1 also forwards the power-rail switching signal 210 to the second power-multiplexer tile 110-2 via the inter-tile signal propagation circuitry 212. Responsive to receipt of the power-rail switching signal 210, the second power-multiplexer tile 110-2 swaps the open and closed states of the first switching circuit 202 and the second switching circuit 204.

This process continues sequentially along the chained series of power-multiplexer tiles 110-1, 110-2, 110-3, and so forth. The sequential switching along the chained arrangement 200 results in a gradual increasing of current draw from the second power rail 104. Eventually, the power-rail switching signal 210 reaches a final, or "terminal," power-multiplexer tile 110 (not explicitly shown). Responsive to receipt of the power-rail switching signal 210, the terminal power-multiplexer tile 110 switches the open and closed states of the first switching circuit 202 and the second switching circuit 204.

During the power-multiplexing operation, there is an overlap time period in which power is supplied to the load power rail 106 from both the first power rail 102 and the second power rail 104. This overlap time period is created at least with respect to first and second switching circuits that are disposed within different power-multiplexer tiles, but the overlap time period can also be created with respect to a first switching circuit 202 and a second switching circuit 204 that are disposed within a same power-multiplexer tile 110. By switching the open and closed states of the first switching circuit 202 and the second switching circuit 204 based on a detection that the second voltage 114 crosses the first voltage 112, the likelihood of a cross-conduction opportunity leading to an appreciable short-circuit current condition is reduced, as is explained with reference to FIG. 3.

Thus, in this example manner, no appreciable short-circuit current is enabled to flow between the first power rail 102 and the second power rail 104 via the load power rail 106. In other words, no substantial short-circuit current is permitted to flow from the first power rail 102 to the second power rail 104, or vice versa, if the power-multiplexing operation is completed while the second voltage 114 is relatively slowly increasing just after crossing over the first voltage 112. Additionally, by swapping the open and closed states of the switching circuits of each power-multiplexer tile 110 sequentially along the chained arrangement 200, power to the circuit load 108 is switched between supply power rails incrementally such that a size of an undesirable voltage droop along the second power rail 104 is at least reduced.

Figure 3:
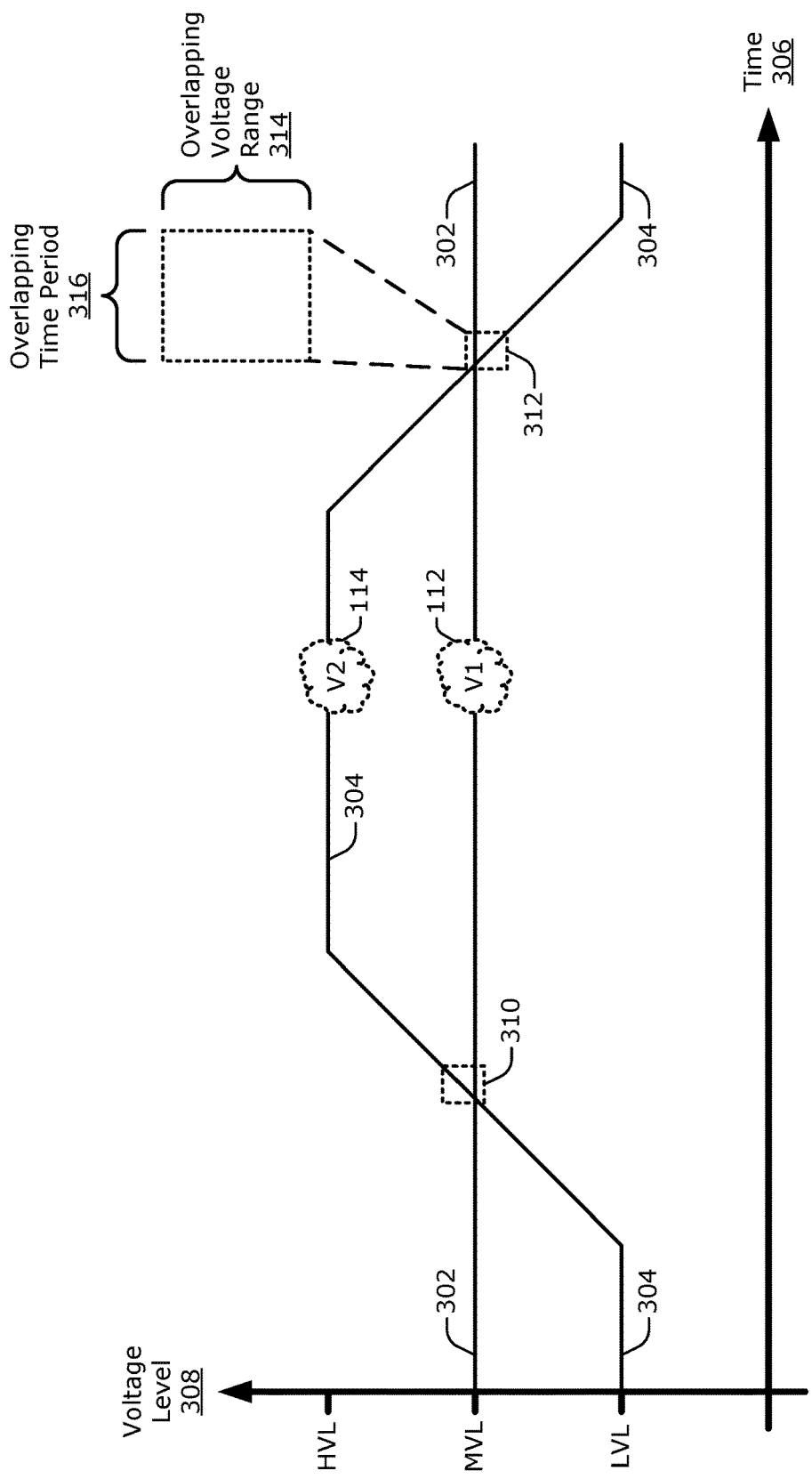
FIG. 3 depicts a graph illustrating example voltage level curves for two power rails over time.

FIG. 3 depicts a graph 300 illustrating example voltage level curves for two power rails over time. As shown, the graph 300 includes a time axis 306 as the abscissa or x-axis and a voltage level axis 308 as the ordinate or y-axis. Thus, time elapses in a rightward direction, and voltage levels increase in an upward direction. Along the voltage level axis 308, three example voltage levels are marked: a low voltage level (LVL), a medium voltage level (MVL), and a high voltage level (HVL). The graph 300 includes a voltage level curve 302 and a voltage level curve 304. An overlapping zone 310 and an overlapping zone 312 are also depicted. The various aspects of FIG. 3, such as the two overlapping zones, are not necessarily depicted to scale.

In this example, a processing core is being powered by the first power rail 102. A memory block, which is an example implementation of the circuit load 108, can be powered by the first power rail 102 or the second power rail 104 via the chained arrangement 200 of the multiple power-multiplexer tiles 110-1 to 110-3. The voltage level curve 302 represents the first voltage 112 for the first power rail 102 over time. The voltage level curve 304 represents the second voltage 114 for the second power rail 104 over time. The medium voltage level (MVL) corresponds to a minimum voltage level that can power the memory block in a reliable manner. The low voltage level (LVL) corresponds to a voltage level for a regular utilization rate of the processing core, and the high voltage level (HVL) corresponds to a boosted voltage level for a high utilization rate of the processing core.

Across the time axis 306, the first voltage 112 for the first power rail 102 is unchanging. This is represented by a flat line for the voltage level curve 302 at the medium voltage level (MVL). However, the second voltage 114 for the second power rail 104 changes during some time periods. Hence, the voltage level curve 304 has segments with non-zero slopes. Initially, the processing core is operating at a regular utilization rate, and the second voltage 114 is at the low voltage level (LVL) as shown at the left side of the voltage level curve 304. At some point, the processor utilization increases. To accommodate the higher utilization rate, responsive to a command 130 issued by the voltage controller 122 (of FIG. 1), the power management integrated circuit 124 increases the second voltage 114 on the second power rail 104 over time to the high voltage level (HVL). To ensure that the memory block can operate sufficiently fast to service the processing core in the boosted mode, the memory block is to be switched to the second power rail 104 for the high voltage level (HVL).

The time period during which the second voltage 114 is increased on the second power rail 104 is represented by the line segment having a positive slope on the left side of the voltage level curve 304. As indicated by the overlapping zone 310, there is a time at which the second voltage level of the second voltage 114 on the second power rail 104 crosses the first voltage level of the first voltage 112 on the first power rail 102, while the second voltage is changing (e.g., increasing). During the overlapping zone 310, the chained arrangement 200 of multiple power-multiplexer tiles 110-1, 110-2, and 110-3 switches from coupling the load power rail 106 to the first power rail 102 to coupling the load power rail 106 to the second power rail 104. The memory block is therefore eventually powered at the high voltage level (HVL) via the second power rail 104.

However, at some point the processor utilization decreases, and the second voltage 114 of the second power rail 104 can be decreased. The voltage controller 122 therefore issues a command 130 instructing the power management integrated circuit 124 to decreases the second voltage 114 on the second power rail 104 over time from the high voltage level (HVL) to the low voltage level (LVL). To ensure that the memory block can operate reliably, the memory block is to be switched back to the first power rail 102 that is being held at the medium voltage level (MVL). The time period during which the second voltage 114 is decreased on the second power rail 104 is represented by the line segment having a negative slope on the right side of the voltage level curve 304. As indicated by the overlapping zone 312, there is a time at which the second voltage level of the second voltage 114 on the second power rail 104 crosses the first voltage level of the first voltage 112 on the first power rail 102, while the second voltage is changing (e.g., decreasing). During the overlapping zone 312, the chained arrangement 200 of multiple power-multiplexer tiles 110-1, 110-2, and 110-3 switches from coupling the load power rail 106 to the second power rail 104 to coupling the load power rail 106 to the first power rail 102. The memory block is therefore powered in a reliable manner at the medium voltage level (MVL) via the first power rail 102.

As shown specifically for the overlapping zone 312, there is a corresponding overlapping time period 316 and overlapping voltage range 314 for both the overlapping zone 310 and the overlapping zone 312. The overlapping voltage range 314 is a range of voltage levels that are sufficiently narrow such that no appreciable cross-conduction current is produced between the first power rail 102 and the second power rail 104 as the voltage level of one passes the voltage level of the other. If the power-multiplexing operation is performed during the overlapping time period 316, then the voltage difference between the first voltage level of the first voltage 112 and the second voltage level of the second voltage 114 falls within the overlapping voltage range 314.

In other words, the load power rail 106 can be simultaneously coupled to the first power rail 102 and the second power rail 104 without enabling an appreciable short-circuit current if the power-multiplexing operation across the chained arrangement 200 is performed sufficiently quickly relative to the rate of change of the voltage level difference between the first voltage 112 and the second voltage 114. In an example implementation, the power-multiplexing operation across the chained arrangement 200 of multiple power-multiplexer tiles 110-1, 110-2, 110-3, and so forth can be accomplished on the order of 100 nanoseconds. This compares with an approximate rate of voltage change of 5 microvolts per millisecond on a supply power rail as the power management integrated circuit 124 changes the voltage level. Thus, in this sense, the power-multiplexing operation can be performed while the second voltage level of the second voltage 114 is substantially similar to the first voltage level of the first voltage 112.

Performance of a power-multiplexing operation within the overlapping zone 310 or the overlapping zone 312 can be accomplished by initiating the operation responsive to the second voltage 114 passing the first voltage 112, in an increasing or a decreasing direction, which passing is detected based on a comparison of the two voltages. This detection of if the second voltage level crosses the first voltage level, in an upward or a downward direction, is described herein with reference to FIGS. 4 and 5. Although the voltage level is changing on only one supply power rail in FIG. 3, the voltage level can be simultaneously changing on two or more power rails during an overlapping zone.

Figure 4:
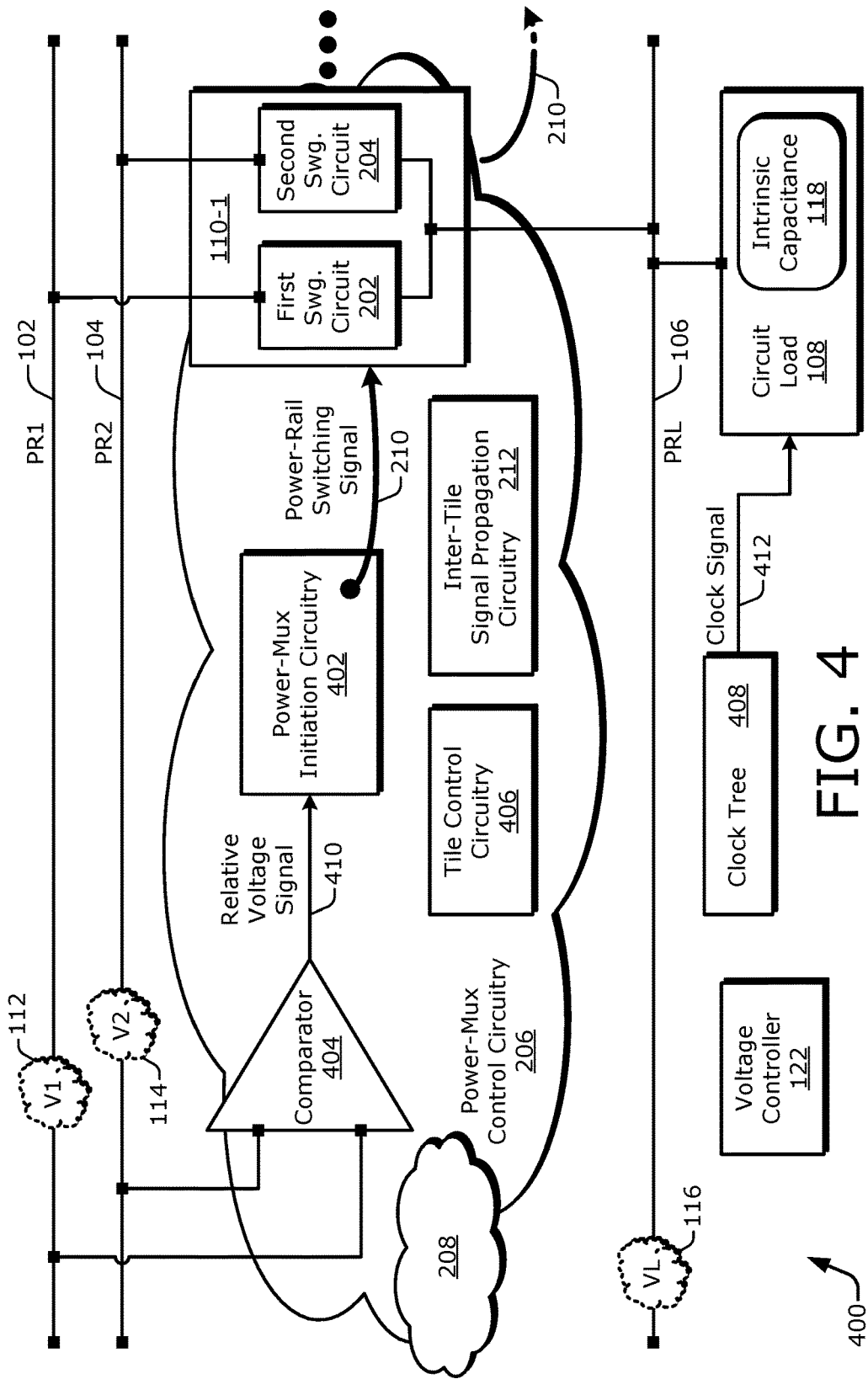
FIG. 4 illustrates an example of power-multiplexer control circuitry and associated power-multiplexing controls signals to control power-multiplexer tiles.

FIG. 4 illustrates generally at 400 an example of power-multiplexer control circuitry 206 and associated power-multiplexer controls signals 208. As shown, the power-multiplexer control circuitry 206 includes a comparator 404, power-multiplexer initiation circuitry 402, tile control circuitry 406, and inter-tile signal propagation circuitry 212. The power-multiplexer control signals 208 include the power-rail switching signal 210 and a relative voltage signal 410. FIG. 4 also illustrates a clock tree 408 and a clock signal 412. The clock tree 408 propagates the clock signal 412 around the integrated circuit and distributes the clock signal 412 to various circuitry, such as the circuit load 108. The clock signal 412 is a periodic clock signal that oscillates between low and high values in a periodic manner.

In example implementations, the power-multiplexer initiation circuitry 402 and the comparator 404 can be realized with one instance apiece for the chained arrangement 200 (of FIG. 2) and are shared with multiple power-multiplexer tiles 110-1 to 110-3. The tile control circuitry 406, on the other hand, is included with each power-multiplexer tile 110. Thus, the chained arrangement 200 of multiple power-multiplexer tiles 110-1 to 110-3 includes multiple tile control circuitries 406. Example implementations of the tile control circuitry 406 are described below with reference to FIGS. 8 through 11-2. The inter-tile signal propagation circuitry 212 is distributed within or between individual ones of the multiple power-multiplexer tiles. Example implementations of the inter-tile signal propagation circuitry 212 are described below with reference to FIG. 8.

The comparator 404 is coupled to the first power rail 102 and the second power rail 104 to receive the first voltage 112 and the second voltage 114, respectively. The comparator 404 performs a comparison including the first voltage 112 of the first power rail 102 and the second voltage 114 of the second power rail 104 to determine which voltage is relatively more or less than the other voltage. The comparator 404 outputs the relative voltage signal 410 that is indicative of a voltage difference between the first voltage 112 of the first power rail 102 and the second voltage 114 of the second power rail 104, such as which voltage is less than or greater than the other or if a changing voltage level of one voltage passes a voltage level of the other voltage. The relative voltage signal 410 is fed to the power-multiplexer initiation circuitry 402.

The power-multiplexer initiation circuitry 402 uses the relative voltage signal 410 to determine if the first voltage 112 of the first power rail 102 passes the second voltage 114 of the second power rail 104, or vice versa, while at least one of the voltages is being changed by the power management integrated circuit 124 (of FIG. 1). Based on the relative voltage signal 410, the power-multiplexer initiation circuitry 402 generates the power-rail switching signal 210. Example implementations of the comparator 404 and the power-multiplexer initiation circuitry 402 are described below with reference to FIGS. 5 through 7-2.

Between each power-multiplexer tile 110, the inter-tile signal propagation circuitry 212 propagates the power-rail switching signal 210 from one power-multiplexer tile 110 to a consecutive power-multiplexer tile 110 along the chained arrangement 200. The inter-tile signal propagation circuitry 212 can also propagate one or more other signals of the power-multiplexer control signals 208. For example, the inter-tile signal propagation circuitry 212 can distribute the relative voltage signal 410 to the tile control circuitry 406 of each power-multiplexer tile 110. Based on the relative voltage signal 410, the tile control circuitry 406 selects the power rail having the higher or highest voltage level for supplying power to the tile control circuitry 406.

Figure 5:
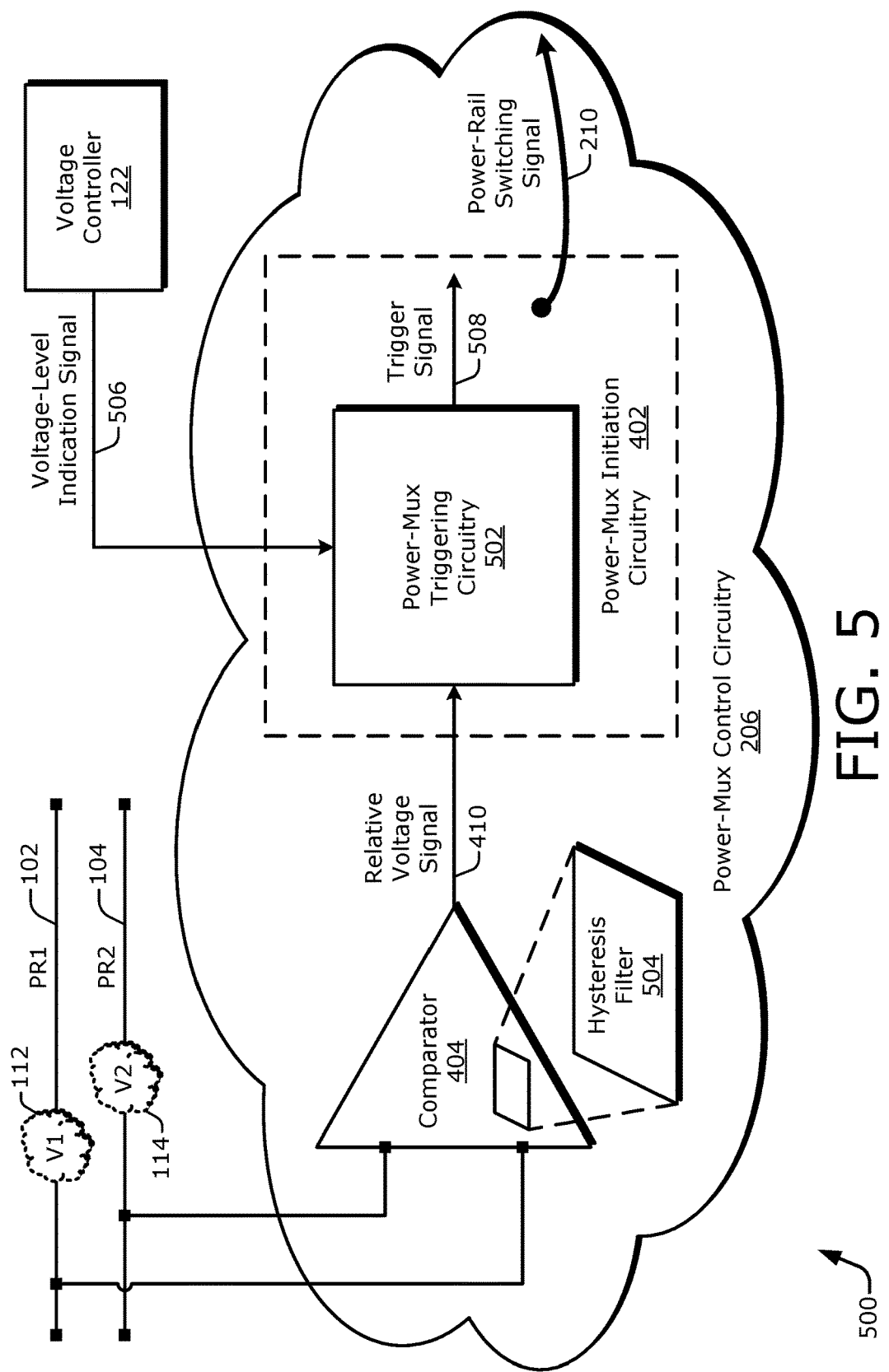
FIG. 5 illustrates an example of power-multiplexer control circuitry that includes a comparator and power-multiplexer initiation circuitry, which includes power-multiplexer triggering circuitry.

FIG. 5 illustrates generally at 500 an example of power-multiplexer control circuitry 206 that includes the comparator 404 and the power-multiplexer initiation circuitry 402. The power-multiplexer initiation circuitry 402 includes power-multiplexer triggering circuitry 502. In addition to the power-multiplexer control circuitry 206, FIG. 5 depicts the first power rail 102, the second power rail 104, and the voltage controller 122. The voltage controller 122 produces a voltage-level indication signal 506.

As part of the power-multiplexer control circuitry 206, the comparator 404 is coupled to the first power rail 102 to receive the first voltage 112 and to the second power rail 104 to receive the second voltage 114. The comparator 404 compares the first voltage 112 to the second voltage 114 and produces the relative voltage signal 410. The relative voltage signal 410 is indicative of which voltage level is greater than, or less than, the other voltage level. For example, if the first voltage 112 is greater than the second voltage 114, the comparator 404 drives a logical "0" value (e.g., a low voltage level) as the relative voltage signal 410. If, on the other hand, the first voltage 112 is less than the second voltage 114, the comparator 404 drives a logical "1" value (e.g., a high voltage level) on the relative voltage signal 410.

In example implementations, the comparator 404 is realized as an analog comparator that accepts two analog inputs and produces a digital output. The comparator 404 makes a comparative voltage measurement to generate the relative voltage signal 410. Further, the comparator 404 can include a hysteresis filter 504. The hysteresis filter 504 operates as a low-pass filter that filters out high-frequency noise on the voltage levels of the first power rail 102 and the second power rail 104. The comparator 404 provides the relative voltage signal 410 to the power-multiplexer triggering circuitry 502 of the power-multiplexer initiation circuitry 402.

The voltage controller 122 provides the voltage-level indication signal 506 to the power-multiplexer triggering circuitry 502. The voltage-level indication signal 506 is indicative of the voltage controller 122 issuing a command to change a voltage level on one of the supply power rails. A command 130 to change a voltage level is issued to the power management integrated circuit 124 (of FIG. 1). For example, the voltage-level indication signal 506 can be indicative of the voltage controller 122 issuing a command 130 to change a voltage level of the second voltage 114 on the second power rail 104. Further, the voltage-level indication signal 506 can be indicative of the voltage controller 122 issuing a command 130 to increase the voltage level of the second voltage 114 on the second power rail 104 to be higher than a voltage level of the first voltage 112 on the first power rail 102. Still further, the voltage-level indication signal 506 can be indicative of the voltage controller 122 issuing a command 130 to increase the voltage level of the second voltage 114 on the second power rail 104 to be higher than a voltage level of the first voltage 112 on the first power rail 102 by some threshold amount. An example threshold amount is on the order of 10s of millivolts. The voltage-level indication signal 506 can be implemented to be the same signal as that for the command 130 for the power management integrated circuit 124 or to be a separate signal.

As shown, the power-multiplexer initiation circuitry 402 includes the power-multiplexer triggering circuitry 502. The power-multiplexer triggering circuitry 502 generates at least one trigger signal 508. In some implementations, the power-multiplexer triggering circuitry 502 receives the relative voltage signal 410 and generates a trigger signal 508 based on the relative voltage signal 410. For example, the trigger signal 508 can be indicative of the second voltage 114 passing the first voltage 112 as the second voltage 114 is being increased. In other implementations, the power-multiplexer triggering circuitry 502 receives the relative voltage signal 410 and the voltage-level indication signal 506. The power-multiplexer triggering circuitry 502 generates a trigger signal 508 based on the relative voltage signal 410 and the voltage-level indication signal 506. For example, the trigger signal 508 can be indicative of a combination of the second voltage 114 passing the first voltage 112 and the power management integrated circuit 124 being under a command 130 from the voltage controller 122 to increase the second voltage 114. By incorporating the voltage-level indication signal 506, the power-multiplexer triggering circuitry 502 increases the likelihood that the at least one trigger signal 508 correctly indicates that a voltage level is actually changing. Example implementations of the power-multiplexer triggering circuitry 502 are described below with reference to FIG. 6.

The power-multiplexer initiation circuitry 402 generates the power-rail switching signal 210 based on the at least one trigger signal 508. Example implementations of the power-multiplexer initiation circuitry 402 having additional components that are used to generate the power-rail switching signal 210 are described below with reference to FIGS. 7-1 and 7-2. After generation, the power-multiplexer initiation circuitry 402 provides the power-rail switching signal 210 to the initial power-multiplexer tile 110-1 (of FIG. 4).

Figure 6:
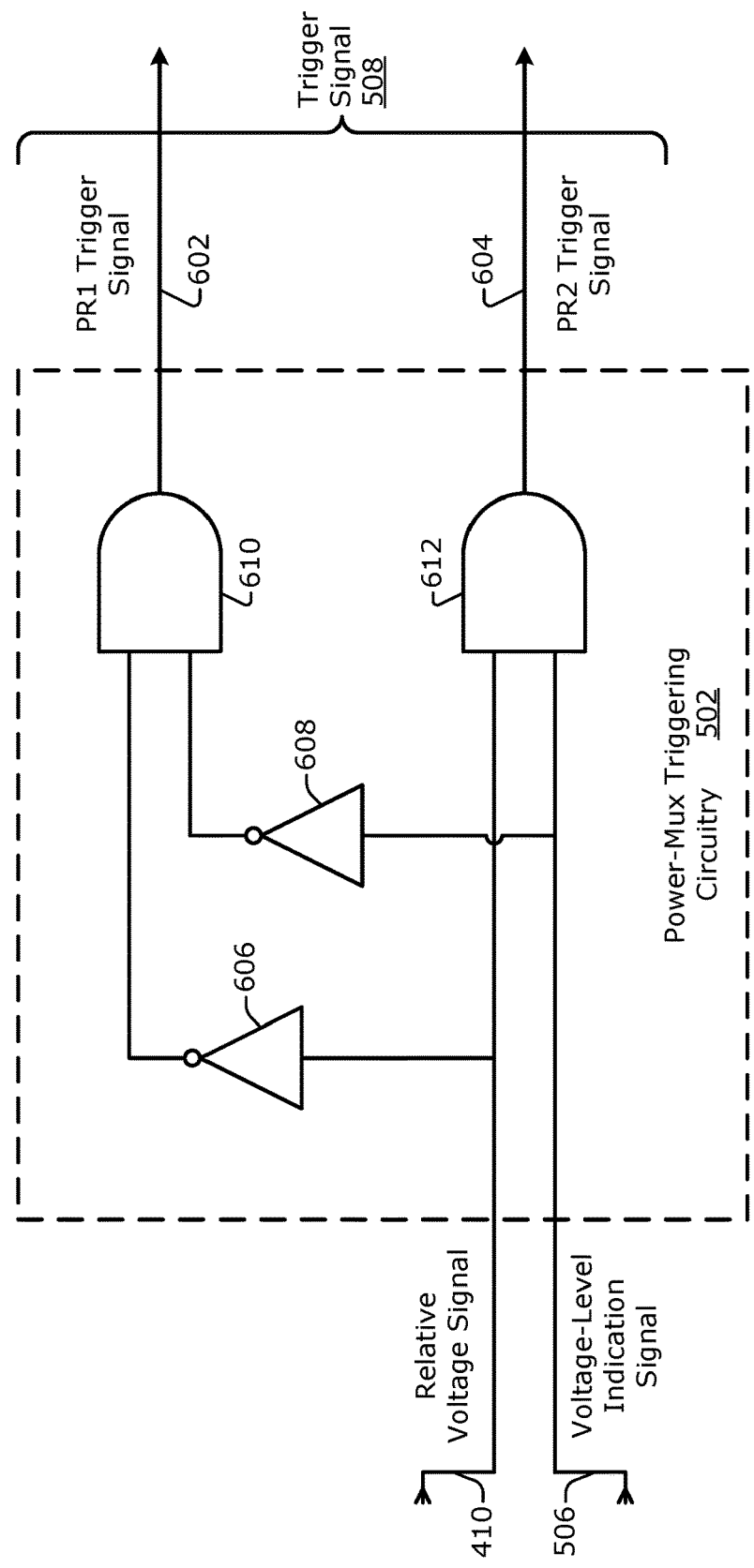
FIG. 6 illustrates an example of power-multiplexer triggering circuitry to generate a trigger signal for a power-multiplexing operation.

FIG. 6 illustrates generally at 600 an example of the power-multiplexer triggering circuitry 502 that generates at least one trigger signal 508. As shown, the trigger signal 508 includes a first power rail trigger signal 602 and a second power rail trigger signal 604. The power-multiplexer triggering circuitry 502 receives the relative voltage signal 410 and the voltage-level indication signal 506. Based on the relative voltage signal 410 and the voltage-level indication signal 506, the power-multiplexer triggering circuitry 502 generates the first power rail trigger signal 602 and the second power rail trigger signal 604.

In example implementations, the power-multiplexer triggering circuitry 502 includes a first inverter 606, a second inverter 608, a first AND gate 610, and a second AND gate 612. The relative voltage signal 410 is coupled to an input of the first inverter 606 and a first input of the second AND gate 612. The voltage-level indication signal 506 is coupled to an input of the second inverter 608 and a second input of the second AND gate 612. An output of the first inverter 606, which is an inverted version of the relative voltage signal 410, is coupled to a first input of the first AND gate 610. An output of the second inverter 608, which is an inverted version of the voltage-level indication signal 506, is coupled to a second input of the first AND gate 610. An output of the first AND gate 610 provides the first power rail trigger signal 602, and an output of the second AND gate 612 provides the second power rail trigger signal 604.

In an example operation, while a voltage level of the second voltage 114 of the second power rail 104 is increasing, the relative voltage signal 410 is asserted by the comparator 404 (of FIG. 5). Here, an asserted signal corresponds to the comparator 404 driving a logical 1 value, such as a high voltage level. However, a logical 1 value can alternatively be implemented with a low voltage level. Because the voltage controller 122 has commanded the power management integrated circuit 124 to increase the second voltage 114, the voltage controller 122 asserts the voltage-level indication signal 506. Thus, with both of the inputs to the second AND gate 612 being asserted, the second power rail trigger signal 604 is asserted due to the logical AND operation. As described below, an asserted second power rail trigger signal 604 causes the chained arrangement 200 to couple the second power rail 104 to the load power rail 106. Meanwhile, if either of the relative voltage signal 410 or the voltage-level indication signal 506 is asserted, the first inverter 606 or the second inverter 608 respectively provides a de-asserted signal to the first input or the second input of the first AND gate 610. Accordingly, the first AND gate 610 provides a de-asserted first power rail trigger signal 602 due to the logical AND operation.

The preceding paragraph pertains to a situation in which the voltage level of the second voltage 114 of the second power rail 104 is increasing, which corresponds to the overlapping zone 310 (of FIG. 3). With respect to the overlapping zone 312, the voltage level of the second voltage 114 of the second power rail 104 is decreasing. Further, the voltage controller 122 ceases asserting the voltage-level indication signal 506 upon commanding the power management integrated circuit 124 to provide a second voltage 114 on the second power rail 104 that is lower than the first voltage 112 on the first power rail 102. The voltage-level indication signal 506 is therefore de-asserted for the overlapping zone 312.

As the second voltage 114 passes the first voltage 112 while decreasing, the comparator 404 changes the value of the relative voltage signal 410 so as to also de-assert the relative voltage signal 410 for the overlapping zone 312. Consequently, after the relative voltage signal 410 and the voltage-level indication signal 506 pass through the first inverter 606 and the second inverter 608, both inputs to the first AND gate 610 are asserted. Thus, the first AND gate 610 asserts the first power rail trigger signal 602 due to the logical AND operation. As described below, an asserted first power rail trigger signal 602 causes the chained arrangement 200 to couple the first power rail 102 to the load power rail 106. The second AND gate 612 also de-asserts the second power rail trigger signal 604 based on the de-asserted relative voltage signal 410 or the de-asserted voltage-level indication signal 506.

Although four circuit devices are arranged in a particular circuit design as shown in FIG. 6, the power-multiplexer triggering circuitry 502 may be implemented in alternative manners. For example, a different number of circuit devices, a different arrangement of circuit devices, or different types of circuit devices can be used to produce the at least one trigger signal 508 based on the relative voltage signal 410 and the voltage-level indication signal 506.

Figures 1, 7:
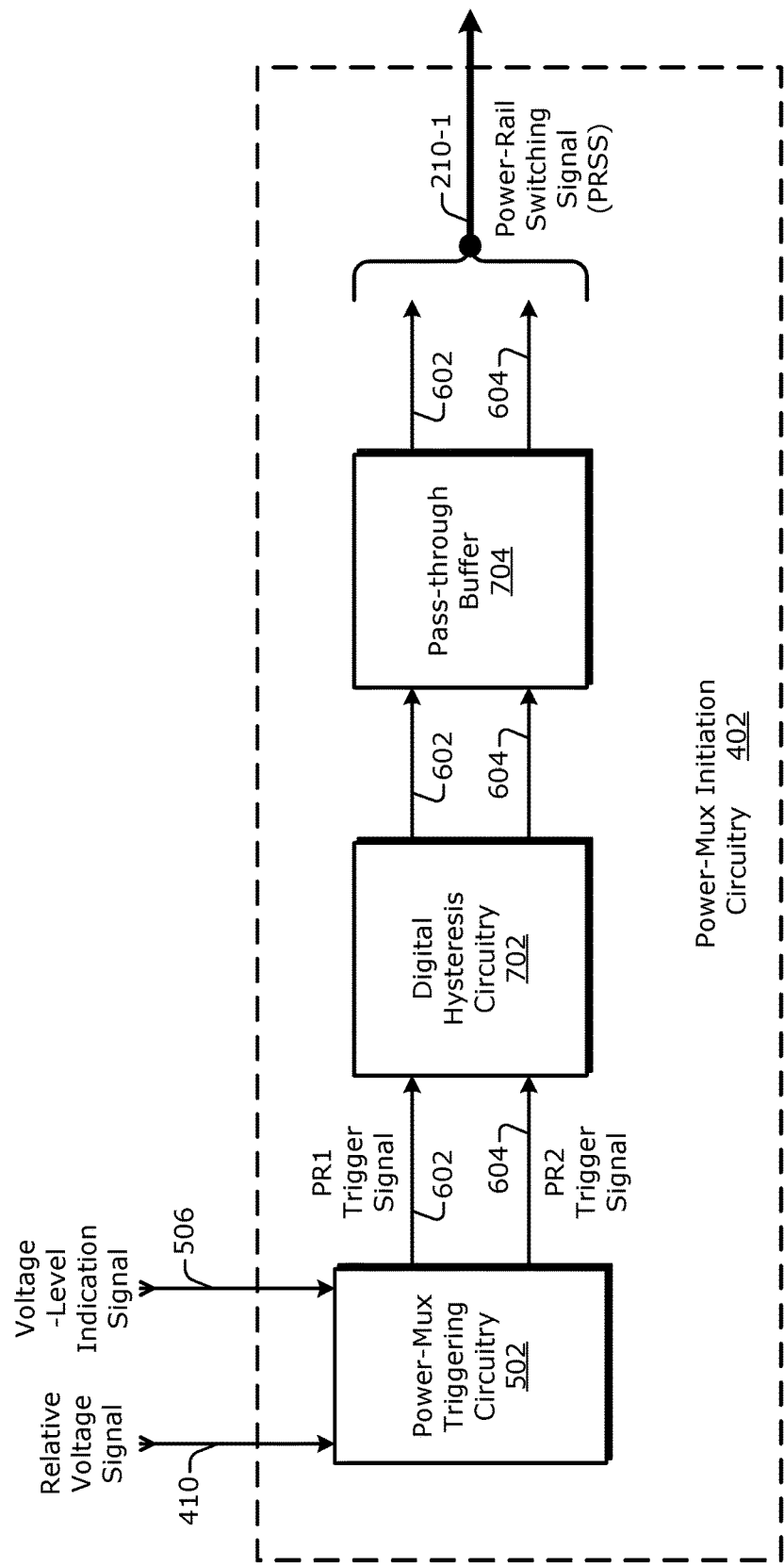
Figures 2, 7:
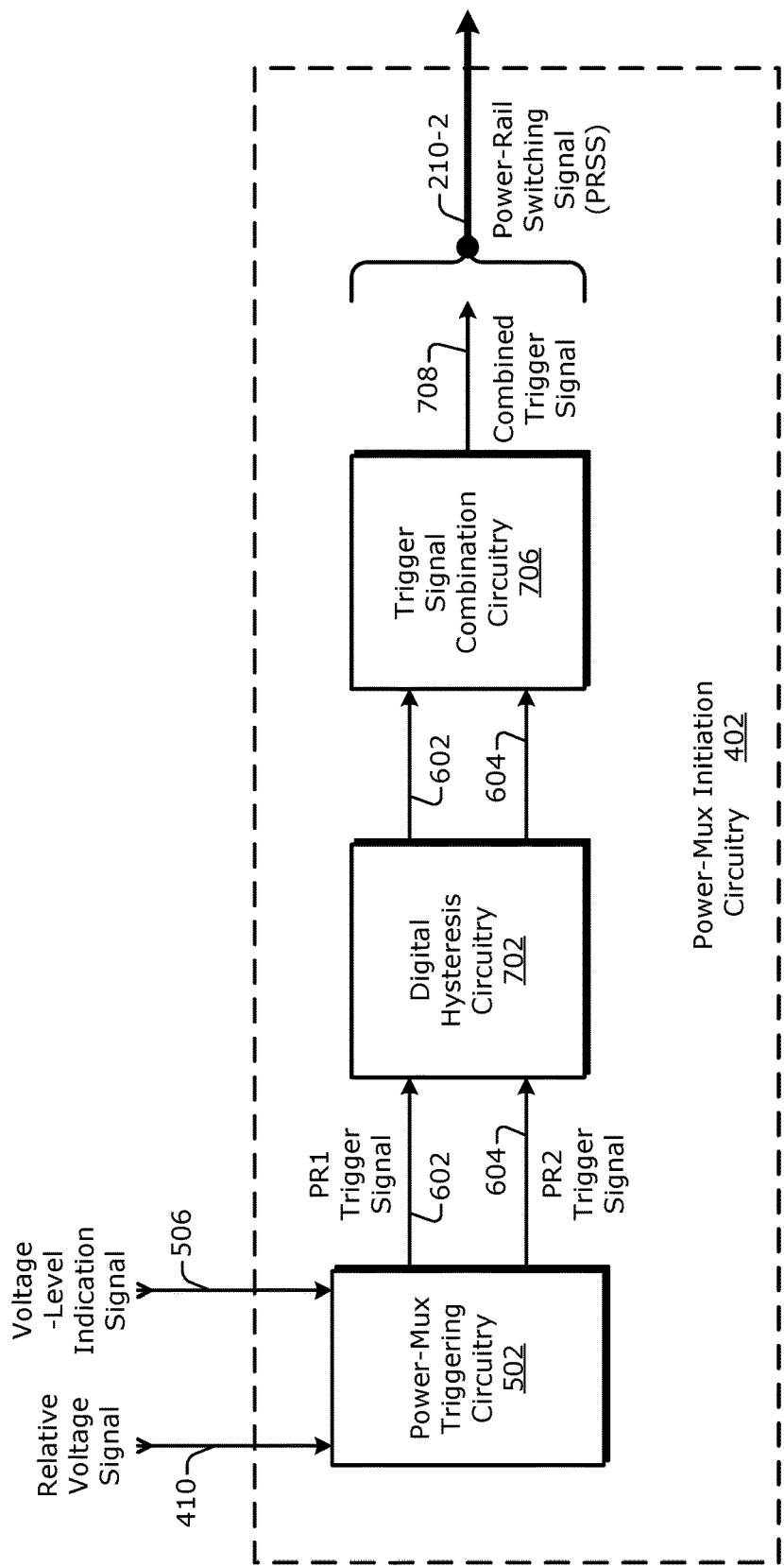
Figures 3, 7:
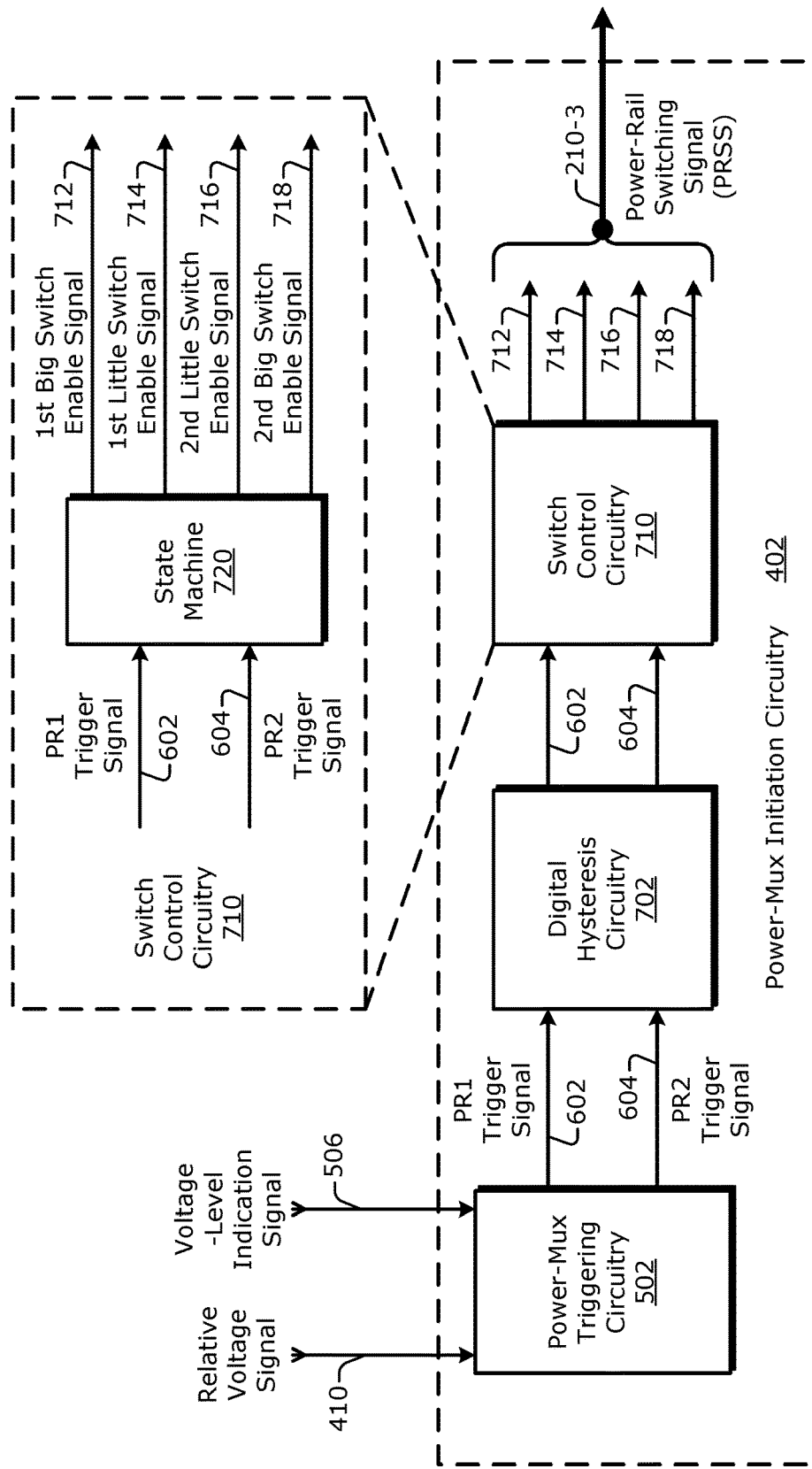

FIG. 7-1 illustrates generally at 700-1 an example of the power-multiplexer initiation circuitry 402 that generates a power-rail switching signal 210-1 using at least one trigger signal. FIG. 7-2 illustrates generally at 700-2 another example of the power-multiplexer initiation circuitry 402 to generate a power-rail switching signal 210-2 using at least one trigger signal. FIG. 7-3 illustrates generally at 700-3 yet another example of the power-multiplexer initiation circuitry 402 to generate a power-rail switching signal 210-3 using at least one trigger signal. In FIGS. 7-1, 7-2, and 7-3, the power-multiplexer triggering circuitry 502 generates the first power rail trigger signal 602 and the second power rail trigger signal 604 based on the relative voltage signal 410 and the voltage-level indication signal 506. As shown, the trigger signals are fed to digital hysteresis circuitry 702.

Specifically, the digital hysteresis circuitry 702 receives the first power rail trigger signal 602 and the second power rail trigger signal 604 and delays forwarding of the trigger signals until the trigger signals have a constant logical value for some delay period. In other words, the digital hysteresis circuitry 702 forwards these two trigger signals if the values of the first power rail trigger signal 602 and the second power rail trigger signal 604 are unchanged for some delay period. For example, the digital hysteresis circuitry 702 holds the trigger signals for some designated number of clock cycles, wherein the designated number of clock cycles can be programmable. If the trigger signals are unchanged for the designated number of clock cycles, the digital hysteresis circuitry 702 forwards the trigger signals for further processing or for propagation as a power-rail switching signal 210.

In FIG. 7-1, the illustrated implementation of the power-multiplexer initiation circuitry 402 includes a pass-through buffer 704. The pass-through buffer 704 receives the first power rail trigger signal 602 and the second power rail trigger signal 604 from the digital hysteresis circuitry 702. The pass-through buffer 704 passes the logical values of the first power rail trigger signal 602 and the second power rail trigger signal 604 in an unchanged form. Thus, the power-rail switching signal 210-1 includes both the first power rail trigger signal 602 and the second power rail trigger signal 604 in this example implementation. An example power-multiplexer tile 110 that is suitable for use with this implementation is described herein with reference to FIG. 11-1.

In FIG. 7-2, the illustrated implementation of the power-multiplexer initiation circuitry 402 includes trigger signal combination circuitry 706. The trigger signal combination circuitry 706 receives the first power rail trigger signal 602 and the second power rail trigger signal 604 from the digital hysteresis circuitry 702. The trigger signal combination circuitry 706 processes the separate logical values of the separate first power rail trigger signal 602 and the second power rail trigger signal 604 to produce a combined trigger signal 708. The combined trigger signal 708 is indicative of which power rail from among two or more power rails is to be coupled to the load power rail 106. For example, the trigger signal combination circuitry 706 drives a logical 1 as the combined trigger signal 708 if the second power rail trigger signal 604 is asserted, but the trigger signal combination circuitry 706 drives a logical 0 as the combined trigger signal 708 if the first power rail trigger signal 602 is asserted. Thus, the power-rail switching signal 210-2 includes the combined trigger signal 708 in this example implementation. Additional circuitry or signaling can be implemented to control power-multiplexing circuitry in which each of the first switching circuit 202 and the second switching circuit 204 includes multiple switches (e.g., multiple transistors) to accommodate power-up scenarios, which are described below with reference to FIGS. 9, 10, and 11-2. An example power-multiplexer tile 110 that is suitable for use with this implementation is described herein with reference to FIG. 11-2.

In FIG. 7-3, the illustrated implementation of the power-multiplexer initiation circuitry 402 includes switch control circuitry 710. The switch control circuitry 710 receives the first power rail trigger signal 602 and the second power rail trigger signal 604 from the digital hysteresis circuitry 702. The switch control circuitry 710 processes the separate logical values of the separate first power rail trigger signal 602 and the second power rail trigger signal 604 to produce multiple switch-enable signals. These multiple switch-enable signals include: a first big switch enable signal 712, a first little switch enable signal 714, a second little switch enable signal 716, and a second big switch enable signal 718. These multiple switch-enable signals can control the enabling or disabling of big and little switches included as part of each of the first switching circuit 202 and the second switching circuit 204. The multiple switch-enable signals cause one supply power rail to be decoupled from the load power rail 106 and another supply power rail to be coupled to the load power rail 106. Thus, in this example implementation the power-rail switching signal 210-3 includes the first big switch enable signal 712, the first little switch enable signal 714, the second little switch enable signal 716, and the second big switch enable signal 718.

As illustrated, the switch control circuitry 710 includes a state machine 720, such as a finite state machine (FSM). The state machine 720 receives the first power rail trigger signal 602 and the second power rail trigger signal 604 and generates the four depicted switch-enable signals. The state machine 720 controls the logical values of these switch-enable signals to open or close switches of the first switching circuit 202 and the second switching circuit 204 to disconnect from one supply power rail and connect to another supply power rail. For example, the state machine 720 drives one logical value on the first big switch enable signal 712 and the first little switch enable signal 714 and another logical value on the second little switch enable signal 716 and the second big switch enable signal 718. The switch-enable signals can therefore be used with power-multiplexing circuitry that is capable of handling power-up scenarios as well as power-multiplexing scenarios. Big and little switches are described herein with reference to FIGS. 9 and 10. An application of these four switch-enable signals is depicted in FIG. 11-3. Thus, an example power-multiplexer tile 110 that is suitable for use with this implementation is described herein with reference to FIG. 11-3.

Figure 8:
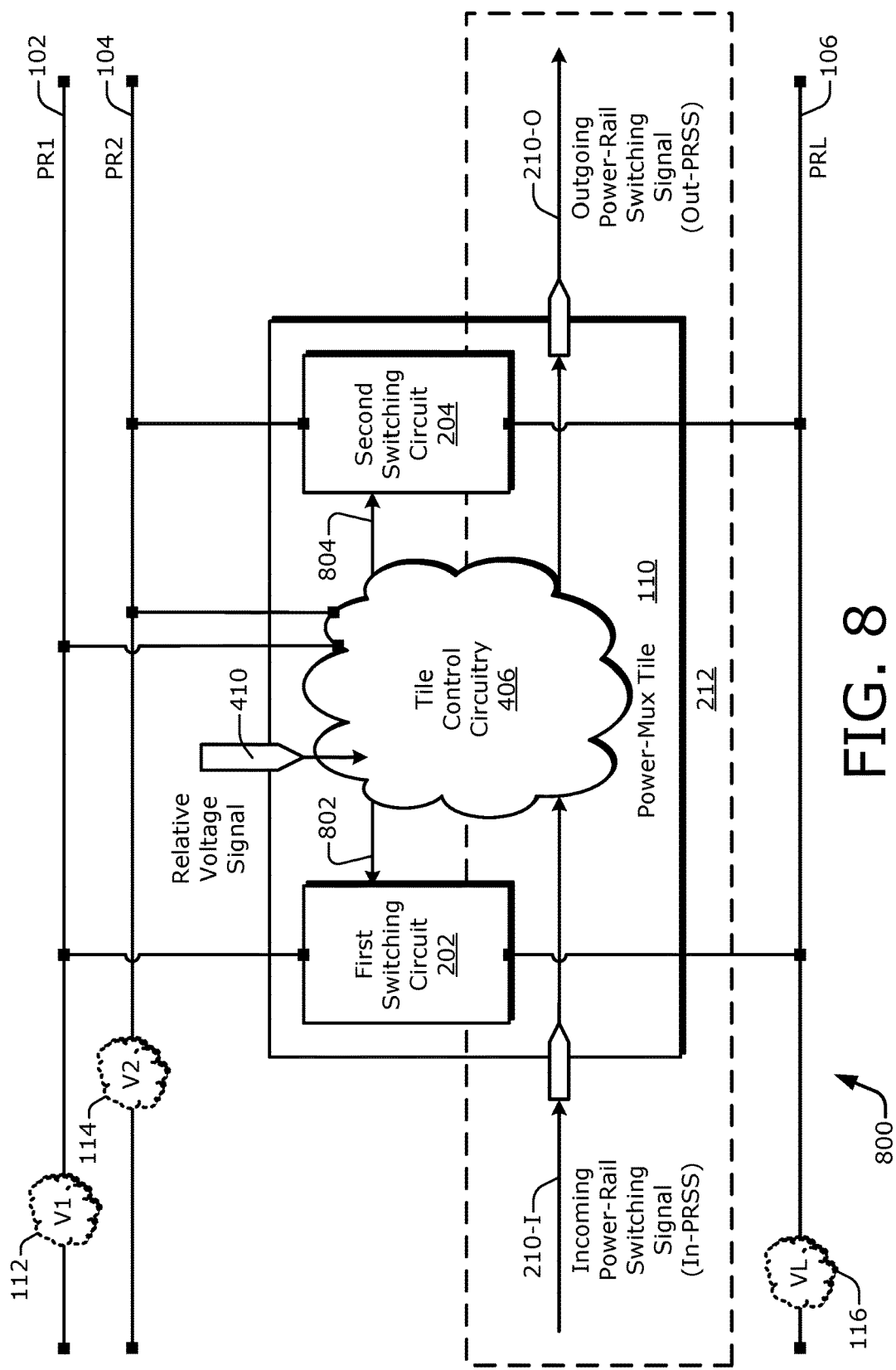
FIG. 8 illustrates an example power-multiplexing control interface and arrangement for a power-multiplexer tile having a first switching circuit and a second switching circuit.

FIG. 8 illustrates generally at 800 an example power-multiplexing control interface and arrangement for a power-multiplexer tile 110. The illustrated power-multiplexer tile 110 represents a power-multiplexer tile along a chained arrangement 200 of multiple power-multiplexer tiles 110-1 to 110-3. The illustrated power-multiplexer tile 110 includes a first switching circuit 202, a second switching circuit 204, and tile control circuitry 406 The first switching circuit 202 is coupled between the first power rail 102 and the load power rail 106. The second switching circuit 204 is coupled between the second power rail 104 and the load power rail 106. FIG. 8 also depicts the inter-tile signal propagation circuitry 212.

The tile control circuitry 406 is configured to control operation of the first switching circuit 202 and the second switching circuit 204 via a control signal 802 and a control signal 804, respectively. For example, the tile control circuitry 406 can place the first switching circuit 202 and the second switching circuit 204 in a closed state or an open state. The tile control circuitry 406 is realized as combinational circuitry or a state machine that places the first switching circuit 202 and the second switching circuit 204 in an appropriate state responsive to the power-multiplexer control signals 208 (of FIG. 2) so as to implement a power rail transition procedure. The tile control circuitry 406 can, for example, be implemented as self-timed circuitry, which operates independently of a periodic clock signal.

From a centralized control circuitry portion of the power-multiplexer control circuitry 206 for the overall chained arrangement 200, the tile control circuitry 406 receives one or more of the power-multiplexer control signals 208. The power-multiplexer control signals 208 include the relative voltage signal 410 and the power-rail switching signal 210. Here, the power-rail switching signal 210 is shown as an incoming power-rail switching signal 210-I and an outgoing power-rail switching signal 210-O. Based on the relative voltage signal 410, the tile control circuitry 406 knows which supply power rail currently has a higher voltage level, either the first power rail 102 or the second power rail 104, and thus which supply power rail is to be used to power the tile control circuitry 406. By using the supply power rail with the higher, or highest, voltage level, the tile control circuitry 406 is able to properly control both switching circuits.

In alternative implementations, tile control circuitry 406 can also use the relative voltage signal 410 to control the power-multiplexing operation. Based on the relative voltage signal 410, the tile control circuitry 406 knows which of the first switching circuit 202 or the second switching circuit 204 is to be activated into the closed state or into the open state. For example, if the relative voltage signal 410 is indicative that the second voltage 114 is higher than the first voltage 112, the tile control circuitry 406 can determine to place the first switching circuit 202 in the open state and the second switching circuit 204 in the closed state. In such implementations, the power-rail switching signal 210 precipitates state changes in the switching circuits of the power-multiplexer tile 110, but the information indicative of which switch is to be activated into which state is contained in the relative voltage signal 410.

The inter-tile signal propagation circuitry 212 can include metal wires, buffers, and other circuitry to propagate control signals between consecutive power-multiplexer tiles along the chained arrangement 200 of multiple power-multiplexer tiles 110-1 to 110-3. Via the inter-tile signal propagation circuitry 212, the tile control circuitry 406 also receives and subsequently forwards the power-rail switching signal 210. More specifically, from left-to-right, the tile control circuitry 406 receives an incoming power-rail switching signal 210-I (In-PRSS) from an immediately preceding power-multiplexer tile in the chain. Responsive to the incoming power-rail switching signal 210-I, the tile control circuitry 406 performs a power-multiplexing operation at the tile level.

To perform the power-multiplexing operation at the tile level, the tile control circuitry 406 opens one switching circuit and closes the other switching circuit. In an example operation, the power-multiplexer tile 110 is switching from coupling the first power rail 102 to the load power rail 106 to coupling the second power rail 104 to the load power rail 106. To do so, the tile control circuitry 406 sends the control signal 802 to the first switching circuit 202. In response to the control signal 802, the first switching circuit 202 switches from a closed state to an open state. The tile control circuitry 406 also sends the control signal 804 to the second switching circuit 204. In response to the control signal 804, the second switching circuit 204 switches from an open state to a closed state. These control signals can be issued sequentially or in parallel, and the state changes can be accomplished in accordance with a periodic clock signal or independent of a periodic clock signal.

More specifically, the tile control circuitry 406 causes the first switching circuit 202 to disconnect the load power rail 106 from the first power rail 102 responsive to receipt of the incoming power-rail switching signal 210-I. The tile control circuitry 406 also causes the second switching circuit 204 to connect the load power rail 106 to the second power rail 104 responsive to the receipt of the incoming power-rail switching signal 210-I. After performing the power-multiplexing operation at the tile level, the tile control circuitry 406 forwards an outgoing power-rail switching signal 210-O (Out-PRSS) to an immediately succeeding power-multiplexer tile in the chain via the inter-tile signal propagation circuitry 212. By causing both the connecting and the disconnecting to be performed in response to a single arrival event of the power-rail switching signal 210, the tile control circuitry 406 facilitates completion of the power-multiplexing operation in one sequential pass along the chained arrangement 200.

Each of the first switching circuit 202 and the second switching circuit 204 can include one, two, or more internal switches. In one example scenario, the chained arrangement 200 of multiple power-multiplexer tiles 110-1 to 110-3 is to operate as a power-multiplexer but not also as a switch during power-up situations. In this scenario, each of the first switching circuit 202 and the second switching circuit 204 can be implemented with a single switch that permits current to flow to the load power rail 106 or prevents current from flowing to the load power rail 106. In another example scenario, the chained arrangement 200 of multiple power-multiplexer tiles 110-1 to 110-3 is to operate as a power-multiplexer at some times and also as a switch during power-up periods. To handle potential power-up current in-rush problems, current is initially restricted to a lower current flow level to address the possibility of enabling current in-rush. After a circuit load has been supplied with some charge, the current is increased to a higher current flow level. To enable these two different current flow levels, two different switches—such as a little switch and a big switch—are included in each of the first switching circuit 202 and the second switching circuit 204. Implementations described with reference to FIGS. 9, 10, and 11-2 include two switches per switching circuit. However, the principles and circuitry described below are also applicable to switching circuits having a single switch, such as the implementations described with reference to FIG. 11-1.

Figure 9:
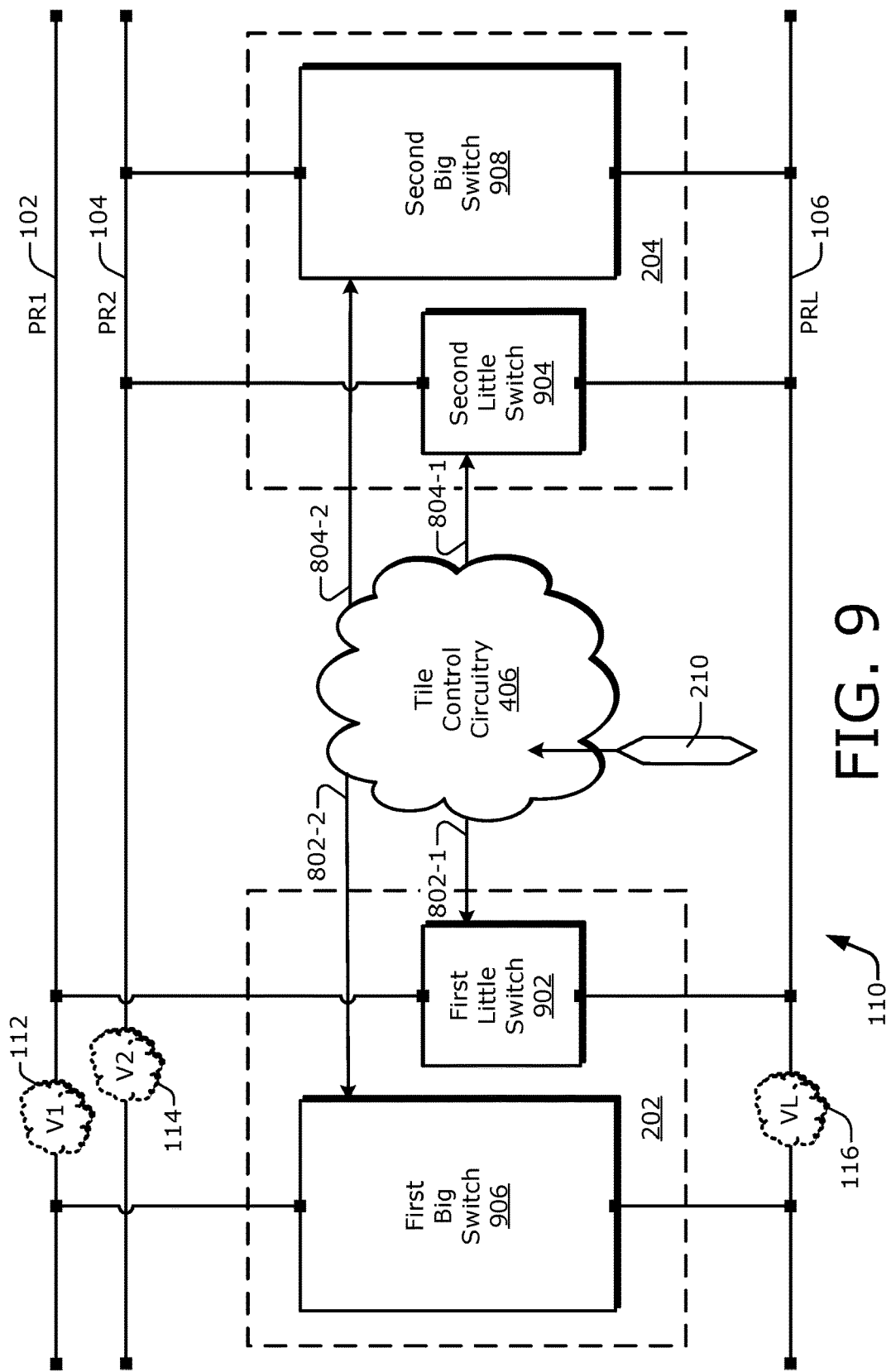
FIG. 9 illustrates an example of a power-multiplexer tile with the first and second switching circuits realized with multiple switches, including big switches and little switches.

FIG. 9 illustrates an example of a power-multiplexer tile 110 with the first switching circuit 202 and the second switching circuit 204 realized with multiple switches, including big switches and little switches. The power-multiplexer tile 110 is also shown to include the tile control circuitry 406. The tile control circuitry 406 receives at least the power-rail switching signal 210. The first switching circuit 202 is coupled between the first power rail 102 and the load power rail 106, and the second switching circuit 204 is coupled between the second power rail 104 and the load power rail 106.

In example implementations, the first switching circuit 202 includes a first little switch 902 and a first big switch 906, and the second switching circuit 204 includes a second little switch 904 and a second big switch 908. The first little switch 902 and the first big switch 906 are coupled between the first power rail 102 and the load power rail 106 in parallel with each other. The second little switch 904 and the second big switch 908 are coupled in parallel with one another between the second power rail 104 and the load power rail 106.

The two big switches are physically larger than the two little switches. The big switches are capable of conducting a larger current than the little switches. By way of example only, the big switches may be 4 to 20 times larger in terms of physical size or current-conducting capacity. The different sizes between the little switches and the big switches can be employed to provide different amounts of current flow, such as a low current flow or a high current flow, to gradually introduce current to a circuit load being powered-up, or switched to a different supply power rail. This technique is analogous to a few versus rest transistor implementation, aspects of which are described herein with reference to FIG. 10.

The first switching circuit 202 and the second switching circuit 204 of the power-multiplexer tile 110 participate in a power rail transition procedure by switching between open and closed states. In the open state, a switch blocks current flow between two power rails, such as a supply power rail and a load power rail. In the closed state, a switch enables current flow between two power rails.

The tile control circuitry 406 determines in which state the various switches are to be operating. The tile control circuitry 406 controls the first little switch 902 and the first big switch 906 via the control signal 802-1 and the control signal 802-2, respectively. The tile control circuitry 406 controls the second little switch 904 and the second big switch 908 via the control signal 804-1 and the control signal 804-2, respectively. The tile control circuitry 406 controls a state of the first little switch 902, the first big switch 906, the second little switch 904, and the second big switch 908 based on the power-rail switching signal 210.

An example power rail transition procedure is described in terms of switching a circuit load coupled to the load power rail 106 from the first power rail 102 to the second power rail 104 if a second voltage level of the second voltage 114 becomes greater than a first voltage level of the first voltage 112. Initially, the first little switch 902 and the first big switch 906 are both in the closed state, and the second little switch 904 and the second big switch 908 are both in the open state. Based on the power-rail switching signal 210, the tile control circuitry 406 uses the control signal 802-1 to switch the first little switch 902 into the open state and the control signal 802-2 to switch the first big switch 906 into the open state. This disconnects the first power rail 102 from the load power rail 106.

Also based on the power-rail switching signal 210, the tile control circuitry 406 uses the control signal 804-1 to switch the second little switch 904 into the closed state and the control signal 804-2 to switch the second big switch 908 into the closed state. This connects the second power rail 104 to the load power rail 106. Succeeding power-multiplexer tiles along the chained arrangement 200 may still be coupling the first power rail 102 to the load power rail 106. Nevertheless, because the voltage levels of the first voltage 112 and the second voltage 114 are within the overlapping voltage range 314 (of FIG. 3), no appreciable cross-conduction current occurs. Thus, the power-multiplexing operation can be performed in a single pass along the chained arrangement 200.

In an example power-up scenario, the multiple power-multiplexer tiles 110-1 to 110-3 function as a distributed power switch during a power-up sequence for a circuit load 108 coupled to the load power rail 106 by closing little switches in a first pass along the chained arrangement 200 and closing big switches in a second pass along the chained arrangement 200. In other words, the little switches and the big switches can be closed in two passes to manage in-rush currents. In this example, a circuit load coupled to the load power rail 106 is being powered up via the first power rail 102. To do so, the first little switches 902 are activated into the closed state in a first pass in one direction along the chained arrangement 200. Subsequently, the first big switches 906 are activated into the closed state in a second pass along the chained arrangement 200, which pass may be in the opposite direction.

Figure 10:
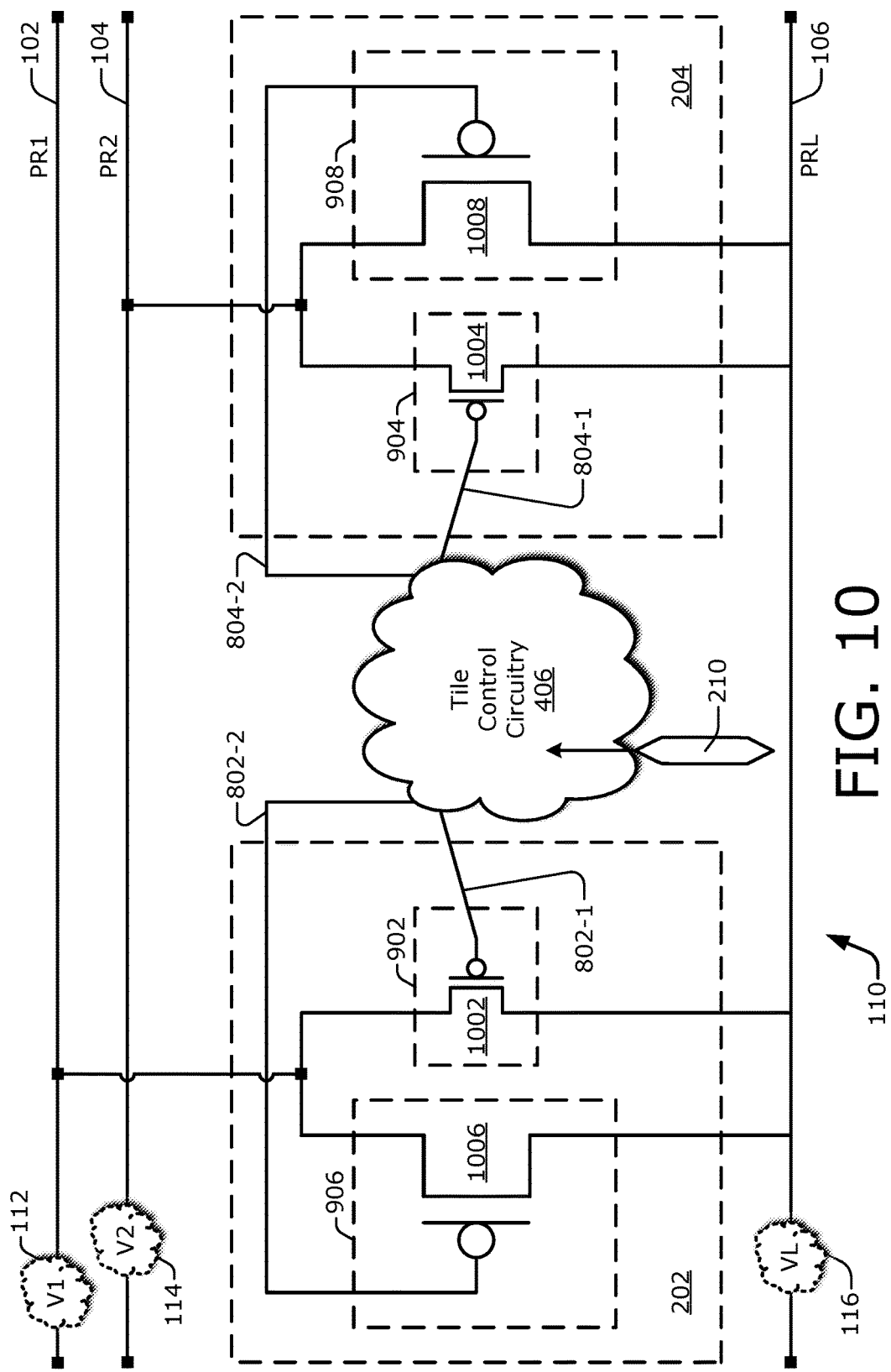
FIG. 10 illustrates an example of a power-multiplexer tile with the first and second switching circuits realized with multiple switches at a transistor level.
Figures 1, 11:
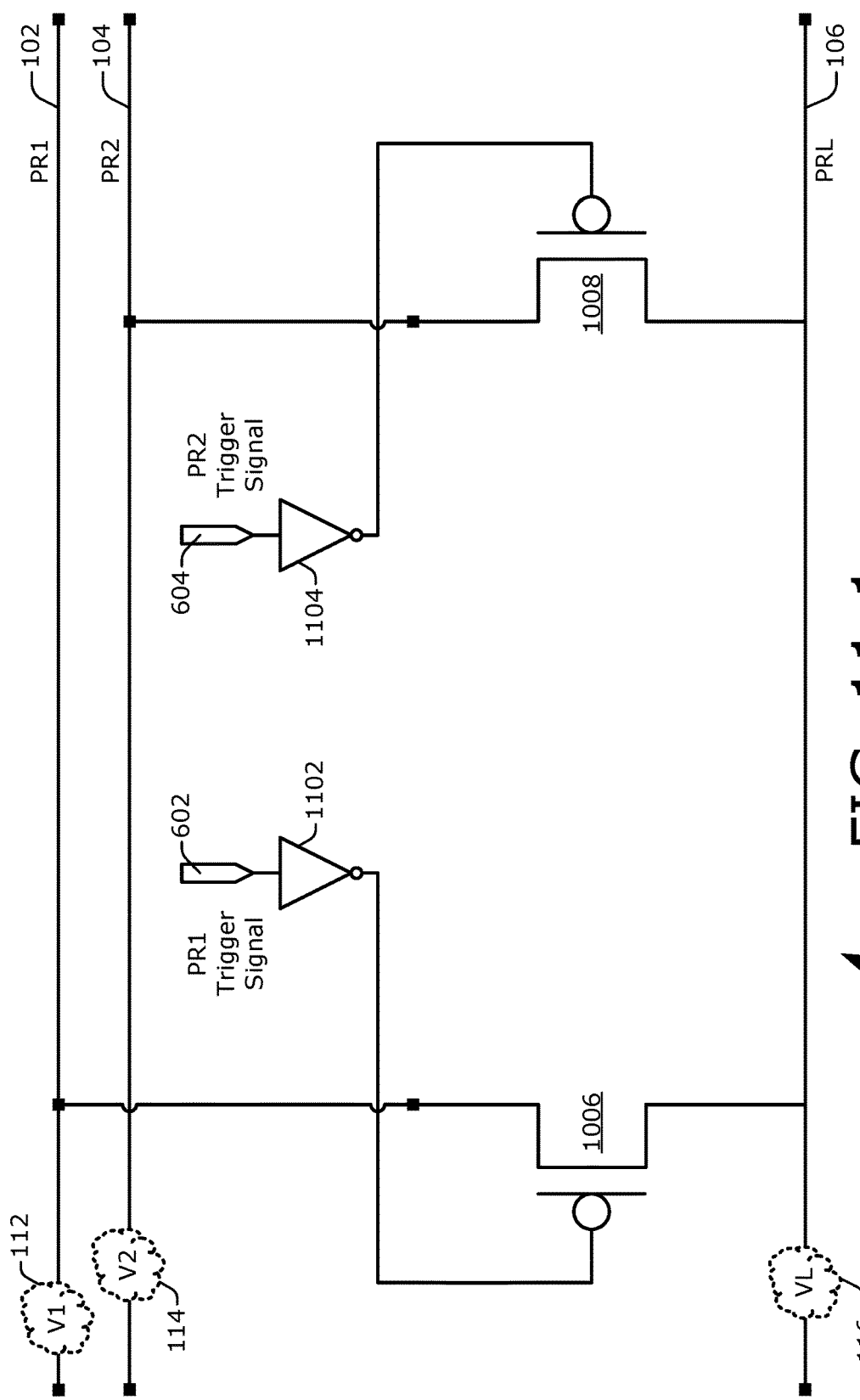
Figures 2, 11:
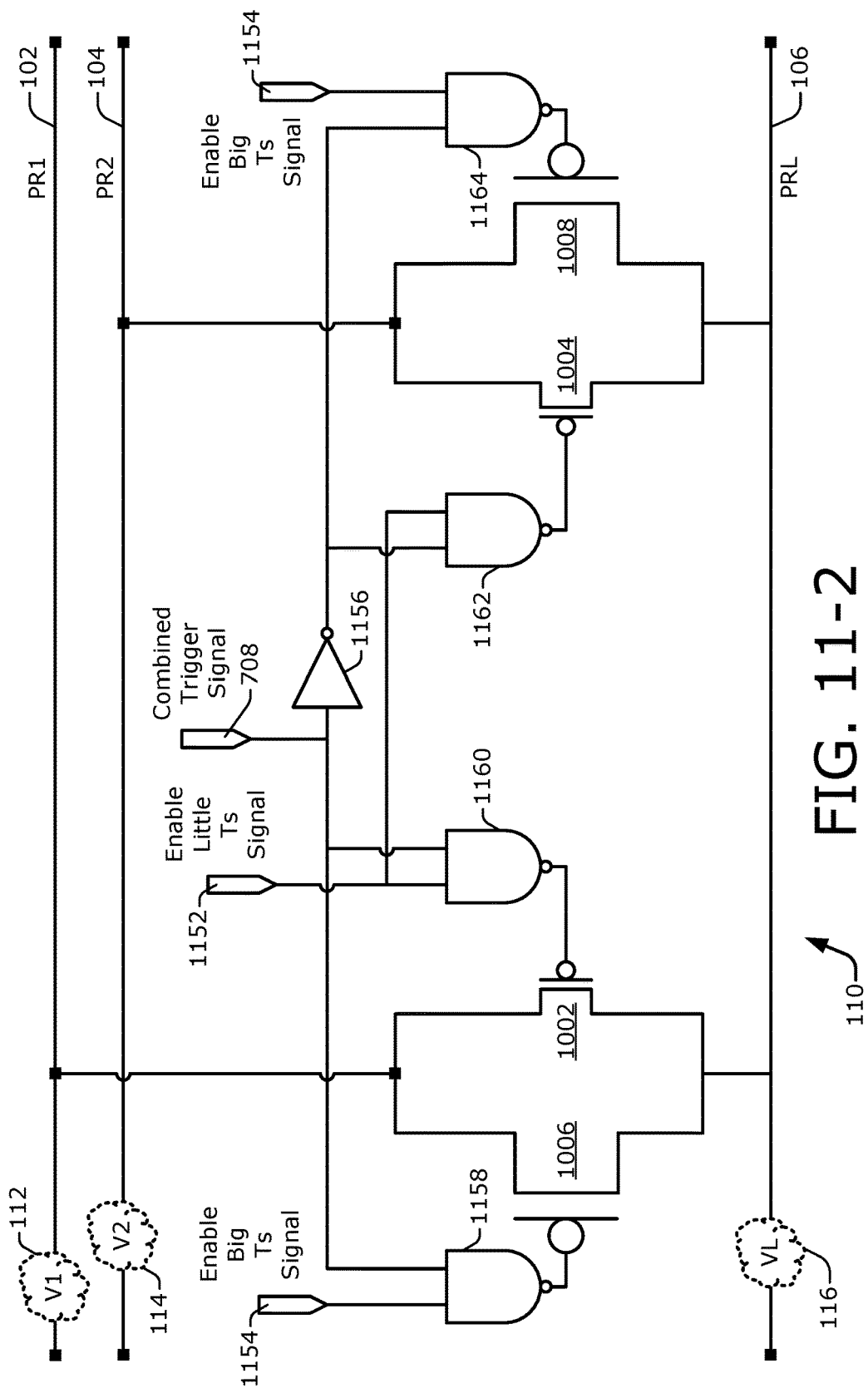
Figures 3, 11:
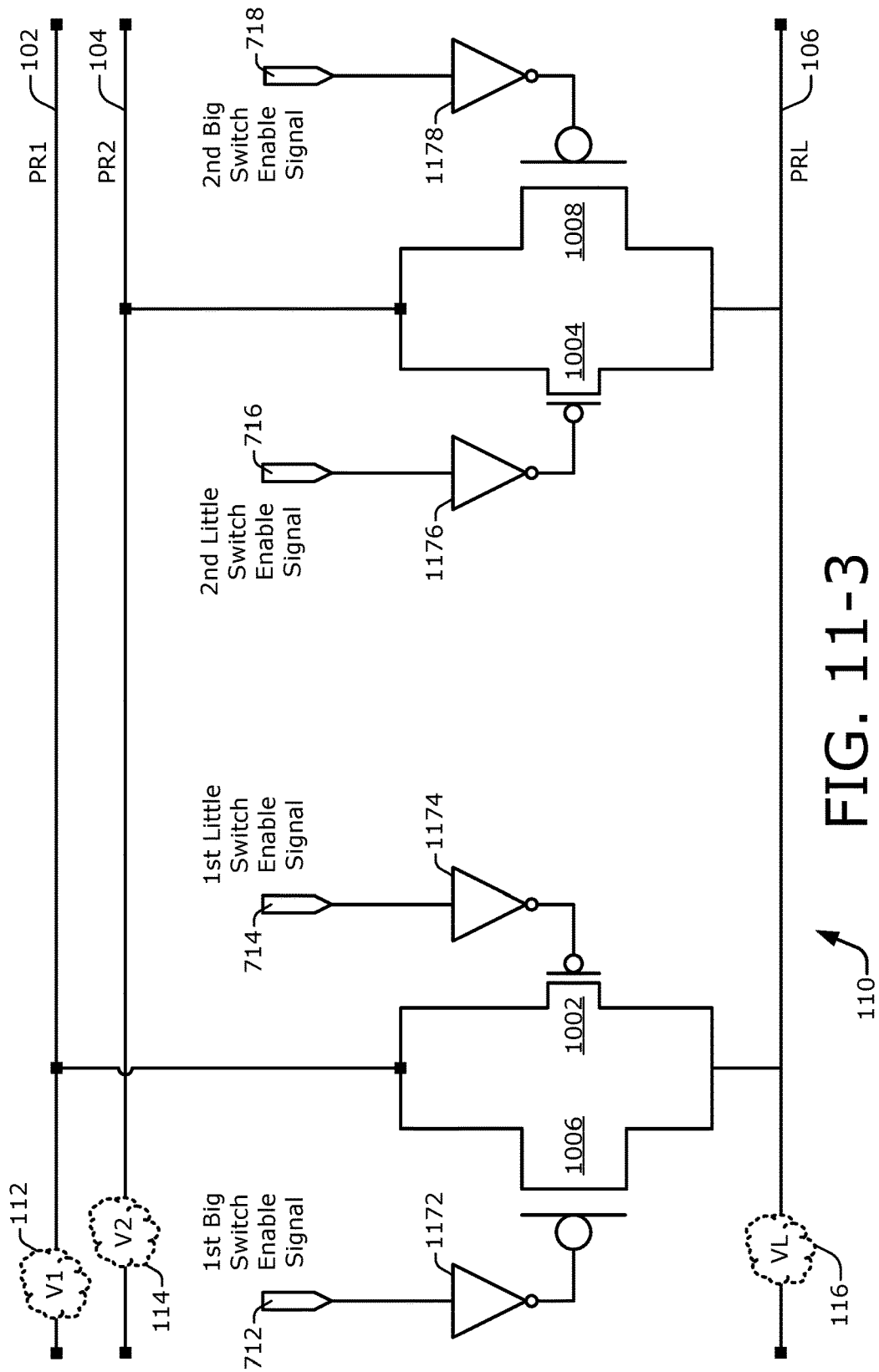

FIG. 10 illustrates an example of a power-multiplexer tile 110 with the first switching circuit 202 and the second switching circuit 204 realized with multiple switches at a transistor level. Thus, the first switching circuit 202 includes a first transistor or multiple first transistors, and the second switching circuit 204 includes a second transistor or multiple second transistors. Specifically, each switch of the power-multiplexer tile 110 is realized using at least one PFET. The first little switch 902 is implemented as a first little transistor, such as a PFET 1002; and the first big switch 906 is implemented as a first big transistor, such as a PFET 1006. The second little switch 904 is implemented as a second little transistor, such as a PFET 1004; and the second big switch 908 is implemented as a second big transistor, such as a PFET 1008.

In some implementations, the PFET 1006 and the PFET 1008 are physically larger than the PFET 1002 and the PFET 1004. Consequently, the PFET 1006 and the PFET 1008 can conduct more current than the other two PFETs. The PFET 1006 and the PFET 1008 are therefore depicted as being relatively larger in FIG. 10. The control signals 802-1, 802-2, 804-1, and 804-2 are routed as shown to the gate terminals of each of the PFET 1002, the PFET 1006, the PFET 1004, and the PFET 1008, respectively. A low voltage at the gate terminal of a PFET turns the transistor on, and a high voltage at the gate terminal of a PFET turns the transistor off. To couple the load power rail 106 to the first power rail 102, for example, the tile control circuitry 406 drives the control signals 802-1 and 802-2 with a low voltage to turn on the PFET 1002 and the PFET 1006, which is analogous to closing the first little switch 902 and the first big switch 906, respectively. To decouple the load power rail 106 from the second power rail 104, the tile control circuitry 406 drives the control signals 804-1 and 804-2 with a high voltage to turn off the PFET 1004 and the PFET 1008, which is analogous to placing the second little switch 904 and the second big switch 908, respectively, in the open state.

The power-multiplexer tile 110 can be operated in accordance with a power supply technique in which a "few" transistors are turned on prior to the "rest" of the transistors. In a few versus rest transistor scheme, the few transistors are turned on first to permit current to flow into a circuit load at a relatively lower rate to reduce the chance that an appreciable voltage droop occurs on the supply power rail. After the current flows have stabilized or after some period of time, the rest of the transistors are turned on to increase the overall current capacity of the power being supplied. With the power-multiplexer tile 110, the little switches correspond to the "few" transistors, and the big switches correspond to the "rest" of the transistors. Accordingly, the little switches can be closed before the big switches in power-up scenarios.

The transistors used to realize the switches of the power-multiplexer tile 110 are PFETs in FIG. 10. If the chained arrangement 200 (of FIG. 2) of multiple power-multiplexer tiles 110-1 to 110-3 is implemented as a head switch 128 (of FIG. 1) that is coupled between supply power rails and the circuit load 108 to create a virtual supply power rail, the switches are realized with PFETs. However, the chained arrangement 200 of multiple power-multiplexer tiles 110-1 to 110-3 can alternatively be implemented as a foot switch (not shown) that is coupled between the circuit load 108 and a ground power rail to create a virtual ground power rail. A foot switch may be implemented using, for example, n-channel or n-type metal-oxide-semiconductor (NMOS) devices that are formed with p-well or p-substrate technology, such as an n-type field effect transistor (NFET). Thus, the switches of the power-multiplexer tile 110 can be realized with one or more NFETs in a foot switch implementation. Furthermore, the switches may be realized with other transistor types, such as a bipolar junction transistor (BJT).

Various example implementations are described above. For instance, each of the first switching circuit 202 and the second switching circuit 204 can be realized with one switch or two or more switches. Additionally, the power-rail switching signal 210 can be realized as separate signals as shown in FIGS. 7-1 and 7-3—e.g., the power-rail switching signal 210-1 including the first power rail trigger signal 602 and the second power rail trigger signal 604, or the power-rail switching signal 210-3 including the first big switch enable signal 712, the first little switch enable signal 714, the second little switch enable signal 716, and the second big switch enable signal 718. Alternatively, the power-rail switching signal 210 can be realized as one signal as shown in FIG. 7-2—e.g., the power-rail switching signal 210 including the combined trigger signal 708. Further, the relative voltage signal 410 from the comparator 404 can be used to determine which supply power rail is to be coupled to the load power rail.

These various aspects can be implemented in a myriad of different permutations. However, three specific example implementations are described below. In FIG. 11-1, the power-rail switching signal 210-1 is realized as two separate signals—the first power rail trigger signal 602 and the second power rail trigger signal 604. Also, each of the first switching circuit 202 and the second switching circuit 204 is realized with one switch (e.g., one transistor). In FIG. 11-2, the power-rail switching signal 210-2 is realized as one signal—the combined trigger signal 708. Also, each of the first switching circuit 202 and the second switching circuit 204 is realized with two switches (e.g., two transistors). In FIG. 11-3, the power-rail switching signal 210-3 is realized as four separate signals—the first big switch enable signal 712, the first little switch enable signal 714, the second little switch enable signal 716, and the second big switch enable signal 718. Also, each of the first switching circuit 202 and the second switching circuit 204 is realized with two switch (e.g., two transistors).

FIG. 11-1 illustrates an example of a power-multiplexing control signaling interface for transistors realizing the first and second switching circuits using a power-rail switching signal in accordance with that of FIG. 7-1. Thus, the power-rail switching signal 210-1 is realized as at least two separate signals—the first power rail trigger signal 602 and the second power rail trigger signal 604, as shown. Also, the first switching circuit 202 (not separately indicated for clarity) is implemented as the PFET 1006, and the second switching circuit 204 is implemented as the PFET 1008. The tile control circuitry 406 (not explicitly shown) is implemented to include two inverters: a first inverter 1102 and a second inverter 1104.

The first inverter 1102 receives the first power rail trigger signal 602 and outputs an inverted version thereof, which is provided to the gate of the PFET 1006. In an example operation, if the load power rail 106 is to be coupled to the first power rail 102, the first power rail trigger signal 602 is asserted with a high voltage level. The first inverter 1102 inverts this to a low voltage level, which turns on the PFET 1006, which permits current to flow from the first power rail 102 to the load power rail 106. On the other hand, if the load power rail 106 is not to be coupled to the first power rail 102, the first power rail trigger signal 602 is de-asserted with a low voltage level. The first inverter 1102 inverts this to a high voltage level, which turns off the PFET 1006, which prevents current from flowing from the first power rail 102 to the load power rail 106.

The second inverter 1104 receives the second power rail trigger signal 604 and outputs an inverted version thereof, which is provided to the gate of the PFET 1008. The voltage levels of the second power rail trigger signal 604, in conjunction with the second inverter 1104, control the on/off state of the PFET 1008 analogously to how the first power rail trigger signal 602 controls the PFET 1006. In this manner, the separate power rail trigger signals disconnect the load power rail 106 from one supply power rail and connect the load power rail 106 to another supply power rail in one pass through the power-multiplexer tile 110.

FIG. 11-2 illustrates an example of a power-multiplexing control signaling interface for transistors realizing the first and second switching circuits using a power-rail switching signal in accordance with that of FIG. 7-2. Thus, the power-rail switching signal 210-2 is realized as one signal—the combined trigger signal 708, as shown. Also, the first switching circuit 202 (not separately indicated for clarity) is implemented with the PFET 1002 and the PFET 1006, and the second switching circuit 204 is implemented as the PFET 1004 and the PFET 1008. The tile control circuitry 406 (not explicitly shown) is implemented to include four NAND gates and one inverter, the trigger signal inverter 1156. The four NAND gates include: a first NAND gate 1158, a second NAND gate 1160, a third NAND gate 1162, and a fourth NAND gate 1164. Each NAND gate includes two inputs and one output.

The example power-multiplexer tile 110 of FIG. 11-2 includes big and little transistors to enable the power-multiplexer tile to be used for power-up scenarios. Accordingly, in addition to the combined trigger signal 708, the control signaling includes an enable little transistors signal 1152 and an enable big transistors signal 1154. Each of the NAND gates has an output that is coupled to a gate terminal of a PFET. Specifically, the first NAND gate 1158 is coupled to the PFET 1006, the second NAND gate 1160 is coupled to the PFET 1002, the third NAND gate 1162 is coupled to the PFET 1004, and the fourth NAND gate 1164 is coupled to the PFET 1008. Hence, the first NAND gate 1158 and the fourth NAND gate 1164 each have an input coupled to the enable big transistors signal 1154. The second NAND gate 1160 and the third NAND gate 1162 each have an input coupled to the enable little transistors signal 1152. These enable signals provide separate control over the little transistors and the big transistors during a power-up scenario.

The NAND gates also provide control with regard to switching between the first power rail 102 and the second power rail 104. Hence, the first NAND gate 1158 and the second NAND gate 1160 each have another input coupled to the combined trigger signal 708. The third NAND gate 1162 and the fourth NAND gate 1164 each have another input coupled to the inverse of the combined trigger signal 708, which is provided by the trigger signal inverter 1156. The combined trigger signal 708 can therefore control whether the first switching circuit 202 or the second switching circuit 204 is activated to permit current flow.

In an example operation, a power-up scenario starts with the load power rail 106 receiving power from the first power rail 102. Accordingly, the combined trigger signal 708 is asserted in an active high manner. This ensures that the third NAND gate 1162 and the fourth NAND gate 1164 output a logical 1 due to the trigger signal inverter 1156, which turns off the PFET 1004 and the PFET 1008, respectively. However, the logical 1 value applied to the first NAND gate 1158 and the second NAND gate 1160 enables the PFET 1006 and the PFET 1002, respectively, to be turned on if the enable signals are also driven to a logical 1 value. In a first pass across the chained arrangement 200, the enable little transistors signal 1152 is asserted, so the PFETs 1002 are turned on in sequential order along the chain. In a second pass, the enable big transistors signal 1154 is asserted, so the PFETs 1006 are also turned on sequential order along the chain. The sequential order in the second pass can be the opposite to that of, or the reverse of, the sequential order in the first pass.

At this point, the load power rail 106 is being powered by the first power rail 102 via both the PFETs 1006 and the PFETs 1002 throughout the multiple power-multiplexer tiles 110-1 to 110-3. If the power-multiplexer triggering circuitry 502 (e.g., of FIG. 7-2) detects that the second voltage level of the second voltage 114 on the second power rail 104 crosses the first voltage level of the first voltage 112 on the first power rail 102, the combined trigger signal 708 is flipped so as to be de-asserted at a logical 0 value, such as a low voltage level. This low voltage level is applied to the first NAND gate 1158 and the second NAND gate 1160, which both produce a high voltage level that turns off the PFET 1006 and the PFET 1002, respectively. The trigger signal inverter 1156, however, inverts this voltage level to a high voltage level. With the enable little transistors signal 1152 and the enable big transistors signal 1154 still asserted, the third NAND gate 1162 and the fourth NAND gate 1164 output low voltage levels to turn on the PFET 1004 and the PFET 1008, respectively. The combined trigger signal 708 is further propagated to a next succeeding power-multiplexer tile 110 using the inter-tile signal propagation circuitry 212. In this manner, the power-multiplexing operation continues along the chained arrangement 200 and can be completed in a single pass.

FIG. 11-3 illustrates an example of a power-multiplexing control signaling interface for transistors realizing the first and second switching circuits using a power-rail switching signal in accordance with that of FIG. 7-3. Thus, the power-rail switching signal 210-3 is realized as at least four separate signals—the first big switch enable signal 712, the first little switch enable signal 714, the second little switch enable signal 716, and the second big switch enable signal 718, as shown. Also, the first switching circuit 202 (not separately indicated for clarity) is implemented with the PFET 1002 and the PFET 1006, and the second switching circuit 204 is implemented as the PFET 1004 and the PFET 1008. The tile control circuitry 406 (not explicitly shown) is implemented to include four inverters: an inverter 1172, an inverter 1174, an inverter 1176, and an inverter 1178.

The state machine 720 (of FIG. 7-3) receives the first power rail trigger signal 602 and the second power rail trigger signal 604 and determines if the load power rail 106 is to be switched from one supply power rail to another supply power rail and which supply power rail is the destination supply power rail. To implement switching functionality, the state machine 720 generates the voltage levels as described below to cause a power-multiplexing operation to be performed by the power-multiplexer tile 110. The inverter 1172 receives the first big switch enable signal 712 and outputs an inverted version thereof, which is provided to the gate of the PFET 1006. The inverter 1174 receives the first little switch enable signal 714 and outputs an inverted version thereof, which is provided to the gate of the PFET 1002.

In an example operation, if the load power rail 106 is to be coupled to the first power rail 102, the first big switch enable signal 712 and the first little switch enable signal 714 are asserted with a high voltage level. The inverter 1172 and the inverter 1174 invert these from high to low voltage levels, which turn on the PFET 1006 and the PFET 1002, respectively. Turning the transistors on permits current to flow from the first power rail 102 to the load power rail 106 via the PFET 1006 and the PFET 1002. On the other hand, if the load power rail 106 is not to be coupled to the first power rail 102, the first big switch enable signal 712 and the first little switch enable signal 714 are de-asserted with a low voltage level. The inverter 1172 and the inverter 1174 invert these from low to a high voltage level, which turns off the PFET 1006 and the PFET 1002, respectively. Turning off these transistors prevents current from flowing from the first power rail 102 to the load power rail 106 at this power-multiplexer tile 110.

With respect to the transistors coupled to the second power rail 104, the inverter 1178 receives the second big switch enable signal 718 and outputs an inverted version thereof, which is provided to the gate of the PFET 1008. The inverter 1176 receives the second little switch enable signal 716 and outputs an inverted version thereof, which is provided to the gate of the PFET 1004. In an example operation, if the load power rail 106 is to be coupled to the second power rail 104, the second big switch enable signal 718 and the second little switch enable signal 716 are asserted with a high voltage level. The inverter 1178 and the inverter 1176 invert these from high to low voltage levels, which turn on the PFET 1008 and the PFET 1004, respectively. Turning the transistors on permits current to flow from the second power rail 104 to the load power rail 106 via the PFET 1008 and the PFET 1004.

On the other hand, if the load power rail 106 is not to be coupled to the second power rail 104, the second big switch enable signal 718 and the second little switch enable signal 716 are de-asserted with a low voltage level. The inverter 1178 and the inverter 1176 invert these from low to a high voltage level, which turns off the PFET 1008 and the PFET 1004, respectively. Turning off these transistors prevents current from flowing from the second power rail 104 to the load power rail 106 at this power-multiplexer tile 110. In these manners, the four switch-enable signals disconnect the load power rail 106 from one supply power rail and connect the load power rail 106 to another supply power rail in one pass through the power-multiplexer tile 110.

Figure 12:
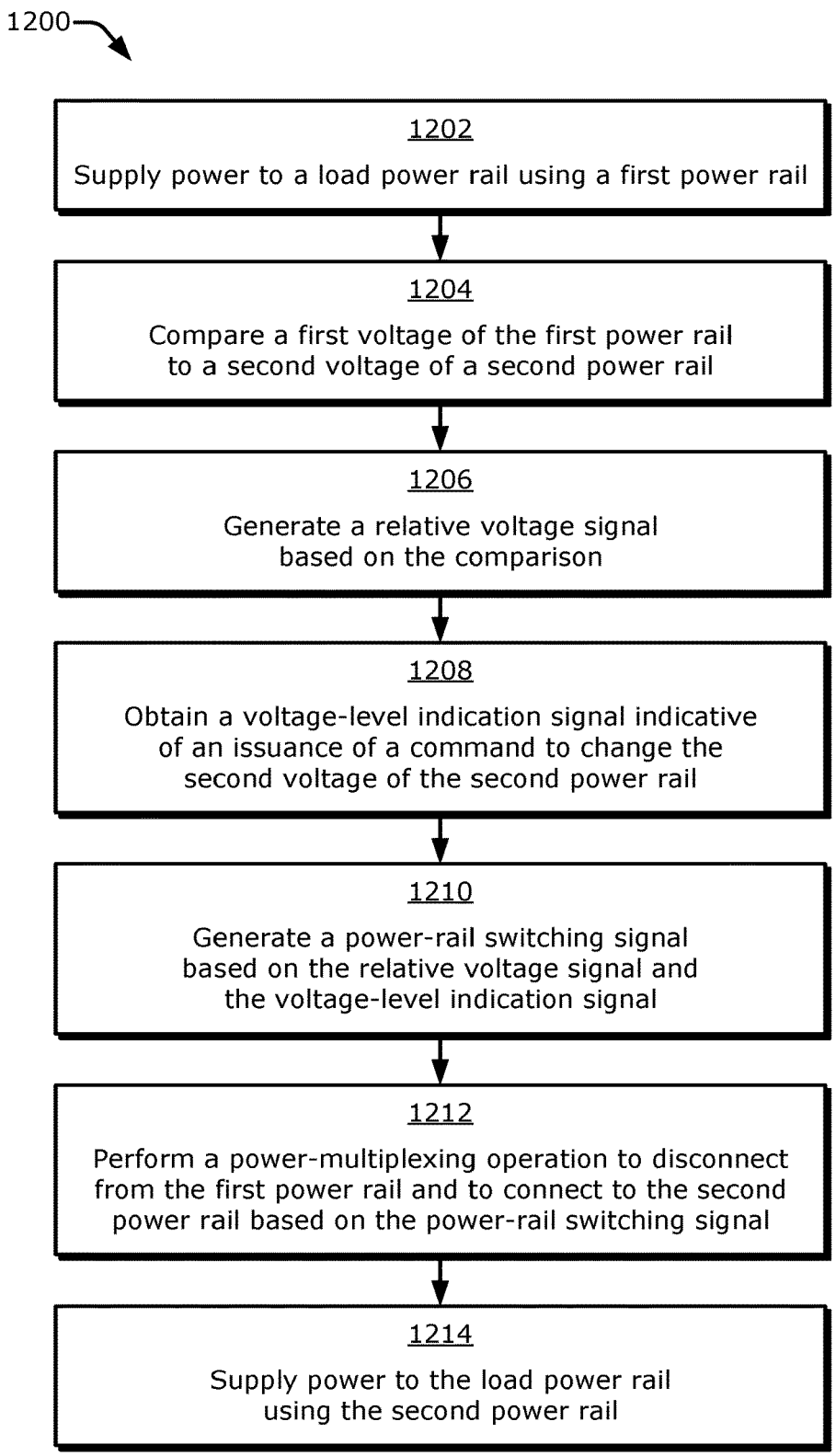
FIG. 12 is a flow diagram illustrating an example process for power multiplexing with an active load.

FIG. 12 is a flow diagram illustrating an example process 1200 for power multiplexing with an active load. The process 1200 is described in the form of a set of blocks 1202-1214 that specify operations that can be performed. However, operations are not necessarily limited to the order shown in FIG. 12 or described herein, for the operations may be implemented in alternative orders or in fully or partially overlapping manners. Operations represented by the illustrated blocks of the process 1200 may be performed by an integrated circuit, such as the integrated circuit 100 of FIG. 1 or the integrated circuit 1310 of FIG. 13, which is described below. More specifically, the operations of the process 1200 may be performed by the chained arrangement 200 of multiple power-multiplexer tiles 110-1 to 110-3 of FIG. 2, in conjunction with the power-multiplexer control circuitry 206 illustrated in FIG. 4.

At block 1202, power is supplied to a load power rail using a first power rail. For example, an integrated circuit can supply power to a load power rail 106 using a first power rail 102. A first switching circuit 202 that is coupled between the first power rail 102 and the load power rail 106 may be in a closed state to permit current flow.

At block 1204, a first voltage of the first power rail is compared to a second voltage of a second power rail. For example, the integrated circuit can compare a first voltage 112 of the first power rail 102 to a second voltage 114 of a second power rail 104. This relative voltage measurement may be performed by a comparator 404 that is coupled to the first power rail 102 and the second power rail 104. At block 1206, a relative voltage signal is generated based on the comparing. For example, the integrated circuit can generate a relative voltage signal 410 based on the comparison. To do so, an analog implementation of the comparator 404 may produce a digital or Boolean value for the relative voltage signal 410 based on which analog voltage level, that of the first voltage 112 or the second voltage 114, is greater.

At block 1208, a voltage-level indication signal indicative of an issuance of a command to change the second voltage of the second power rail is obtained. For example, the integrated circuit can obtain a voltage-level indication signal 506 indicative of an issuance of a command 130 to change the second voltage 114 of the second power rail 104. A voltage controller 122, for instance, may output a voltage-level indication signal 506 that indicates that the voltage controller 122 has issued a command 130 to a power management integrated circuit 124 to change the second voltage 114 of the second power rail 104. By obtaining the voltage-level indication signal 506, power-multiplexer control circuitry 206 can corroborate or verify that a detected voltage level change is intentional, as opposed to the result of noise or a spurious problem with a power distribution network 120.

At block 1210, a power-rail switching signal is generated based on the relative voltage signal and the voltage-level indication signal. For example, the integrated circuit can generate a power-rail switching signal 210 based on the relative voltage signal 410 and the voltage-level indication signal 506. Power-multiplexer initiation circuitry 402 may generate the power-rail switching signal 210, which is asserted to initiate a power-multiplexing operation, if a detected change in a differential between supply voltage levels is corroborated by an indication that the changed supply voltage differential is intentionally being caused.

At block 1212, a power-multiplexing operation to disconnect from the first power rail and to connect to the second power rail is performed based on the power-rail switching signal. For example, the integrated circuit can perform a power-multiplexing operation to disconnect from the first power rail 102 and to connect to the second power rail 104 based on the power-rail switching signal 210. For instance, power-multiplexer control circuitry 206 may cause first switching circuits 202 to be opened and second switching circuits 204 to be closed in each power-multiplexer tile 110 along a chained arrangement 200 of multiple power-multiplexer tiles 110-1 to 110-3.

At block 1214, power is supplied to the load power rail using the second power rail. For example, the integrated circuit can supply power to the load power rail 106 using the second power rail 104. Thus, a second switching circuit 204 that is coupled between the second power rail 104 and the load power rail 106 in each power-multiplexer tile 110 may continue to be in a closed state to permit current to flow.

An example implementation of the relative voltage signal generation at block 1206 includes determining that the relative voltage signal 410 is indicative that the second voltage 114 is greater than the first voltage 112 and determining that the voltage-level indication signal 506 is indicative of the issuance of a command 130 to increase the second voltage 114 above the first voltage 112.

Example implementations of the process 1200 can further include an operation of filtering out noise that affects the first voltage 112 or the second voltage 114. The filtering may be performed using, for instance, a hysteresis filter 504 or digital hysteresis circuitry 702. Other example implementations of the process 1200 can further include an operation of, during the performing of the power-multiplexing operation, providing an oscillating clock signal 412 to a circuit load 108 coupled to the load power rail 106 and continuing active operation of the circuit load 108 responsive to the oscillating clock signal 412.

An example implementation of the power-multiplexing operation performance at block 1212 includes propagating the power-rail switching signal 210 along a chained arrangement 200 of multiple power-multiplexer tiles 110-1 to 110-3. The performance further includes, at each power multiplexer tile 110, disconnecting the load power rail 106 from the first power rail 102 responsive to receiving the power-rail switching signal 210 and connecting the load power rail 106 to the second power rail 104 responsive to receipt of the power-rail switching signal 210. In other example implementations, the disconnecting and the connecting are performed in a single sequential pass along the chained arrangement 200 of the multiple power-multiplexer tiles 110-1 to 110-3.

Figure 13:
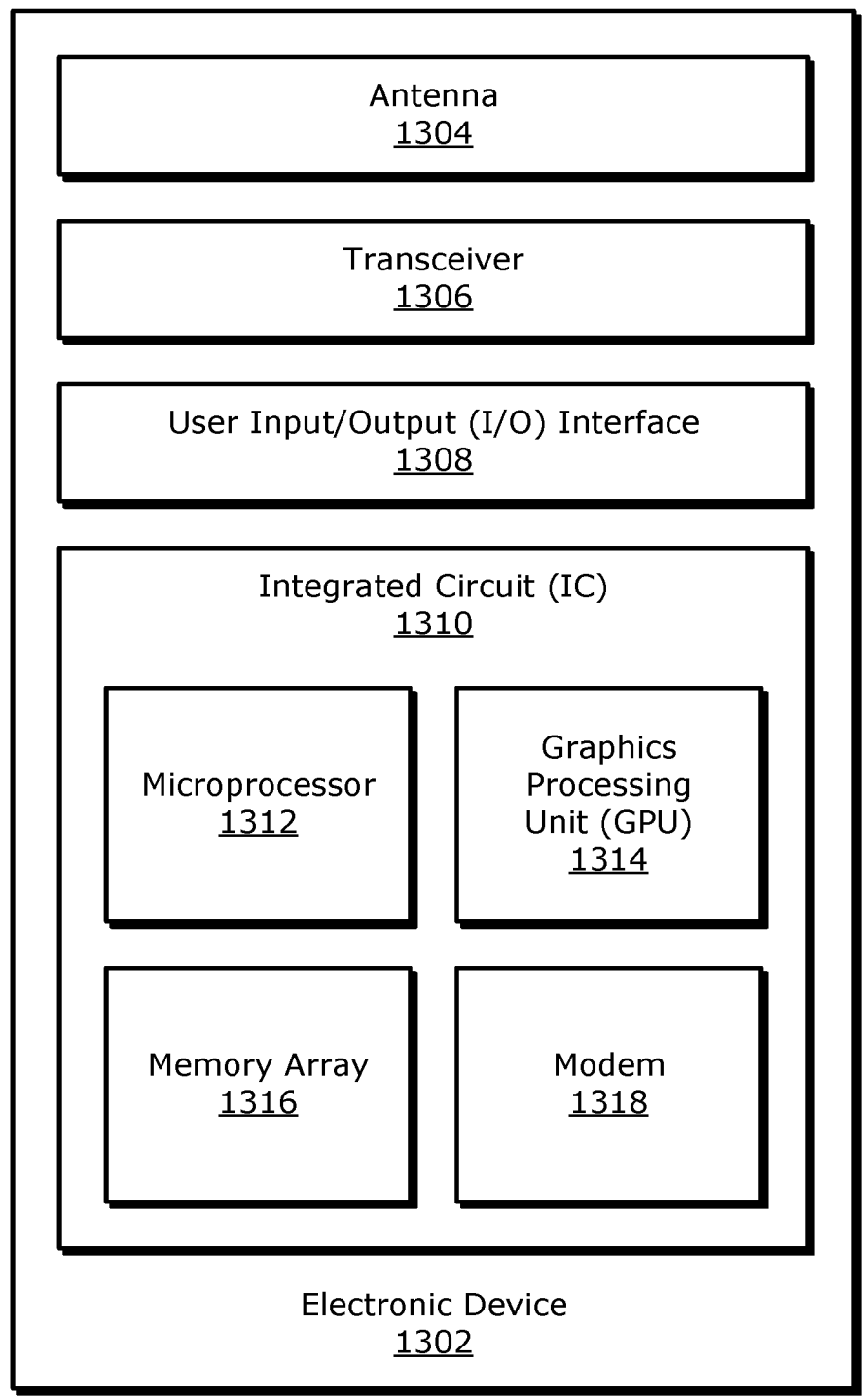
FIG. 13 illustrates an example electronic device that includes an integrated circuit having multiple cores.

FIG. 13 depicts an example electronic device 1302 that includes an integrated circuit (IC) 1310 having multiple cores. As shown, the electronic device 1302 includes an antenna 1304, a transceiver 1306, and a user input/output (I/O) interface 1308 in addition to the integrated circuit 1310. Illustrated examples of the integrated circuit 1310, or cores thereof, include a microprocessor 1312, a graphics processing unit (GPU) 1314, a memory array 1316, and a modem 1318. In one or more implementations, power management techniques as described herein can be implemented by the integrated circuit 1310.

The electronic device 1302 can be a mobile or battery-powered device or a fixed device that is designed to be powered by an electrical grid. Examples of the electronic device 1302 include a server computer, a network switch or router, a blade of a data center, a personal computer, a desktop computer, a notebook or laptop computer, a tablet computer, a smart phone, an entertainment appliance, or a wearable computing device such as a smartwatch, intelligent glasses, or an article of clothing. An electronic device 1302 can also be a device, or a portion thereof, having embedded electronics. Examples of the electronic device 1302 with embedded electronics include a passenger vehicle, industrial equipment, a refrigerator or other home appliance, a drone or other unmanned aerial vehicle (UAV), or a power tool.

For an electronic device with a wireless capability, the electronic device 1302 includes an antenna 1304 that is coupled to a transceiver 1306 to enable reception or transmission of one or more wireless signals. The integrated circuit 1310 may be coupled to the transceiver 1306 to enable the integrated circuit 1310 to have access to received wireless signals or to provide wireless signals for transmission via the antenna 1304. The electronic device 1302 as shown also includes at least one user I/O interface 1308. Examples of the user I/O interface 1308 include a keyboard, a mouse, a microphone, a touch-sensitive screen, a camera, an accelerometer, a haptic mechanism, a speaker, a display screen, or a projector.

The integrated circuit 1310 may comprise, for example, one or more instances of a microprocessor 1312, a GPU 1314, a memory array 1316, a modem 1318, and so forth. The microprocessor 1312 may function as a central processing unit (CPU) or other general-purpose processor. Some microprocessors include different parts, such as multiple processing cores, that may be individually powered on or off. The GPU 1314 may be especially adapted to process visual-related data for display. If visual-related data is not being rendered or otherwise processed, the GPU 1314 may be fully or partially powered down. The memory array 1316 stores data for the microprocessor 1312 or the GPU 1314. Example types of memory for the memory array 1316 include random access memory (RAM), such as dynamic RAM (DRAM) or static RAM (SRAM); flash memory; and so forth. If programs are not accessing data stored in memory, the memory array 1316 may be powered down overall or block-by-block. The modem 1318 demodulates a signal to extract encoded information or modulates a signal to encode information into the signal. If there is no information to decode from an inbound communication or to encode for an outbound communication, the modem 1318 may be idled to reduce power consumption. The integrated circuit 1310 may include additional or alternative parts than those that are shown, such as an I/O interface, a sensor such as an accelerometer, a transceiver or another part of a receiver chain, a customized or hard-coded processor such as an application-specific integrated circuit (ASIC), and so forth.

The integrated circuit 1310 may also comprise a system on a chip (SOC). An SOC may integrate a sufficient number of different types of components to enable the SOC to provide computational functionality as a notebook computer, a mobile phone, or another electronic apparatus using one chip, at least primarily. Components of an SOC, or an integrated circuit 1310 generally, may be termed cores or circuit blocks. A core or circuit block of an SOC may be powered down if not in use, such as by undergoing a power collapse or being multiplexed onto a power rail having a lower voltage level, according to the techniques described in this document. Examples of cores or circuit blocks include, in addition to those that are illustrated in FIG. 13, a voltage regulator, a main memory or cache memory block, a memory controller, a general-purpose processor, a cryptographic processor, a video or image processor, a vector processor, a radio, an interface or communications subsystem, a wireless controller, or a display controller. Any of these cores or circuit blocks, such as a processing or GPU core, may further include multiple internal cores or circuit blocks.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
a first power rail configured to be held at a first voltage;
a second power rail configured to be held at a second voltage;
a load power rail;
multiple power-multiplexer tiles coupled in series in a chained arrangement and configured to jointly perform a power-multiplexing operation responsive to a power-rail switching signal, each power multiplexer tile configured to switch between coupling the load power rail to the first power rail and coupling the load power rail to the second power rail; and
power-multiplexer control circuitry coupled to the first power rail and the second power rail, the power-multiplexer control circuitry including:
a comparator configured to produce a relative voltage signal based on the first voltage and the second voltage, the power-multiplexer control circuitry configured to generate the power-rail switching signal based on the relative voltage signal; and
inter-tile signal propagation circuitry that couples the multiple power-multiplexer tiles in series and is configured to propagate the power-rail switching signal between consecutive power-multiplexer tiles along the chained arrangement.

2. The apparatus of claim 1, further comprising:
a circuit load coupled to the load power rail,
wherein the power-multiplexer control circuitry is configured to overlap the coupling of the load power rail to the first power rail and the coupling of the load power rail to the second power rail to continuously provide power to the circuit load via at least one of the first power rail or the second power rail during the power-multiplexing operation.

3. The apparatus of claim 2, wherein the circuit load is configured to receive a periodic clock signal and to continue active operation based on the periodic clock signal during the power-multiplexing operation.

4. The apparatus of claim 1, further comprising:
a processor;
a modem; and
a display screen operably coupled to at least one of the processor or the modem, wherein
at least one of the processor or the modem is coupled to the load power rail to receive power; and
the processor and the modem are configured to cause the display screen to display visual-related data responsive to a communication decoded by the modem.

5. The apparatus of claim 1, wherein:
the comparator is configured to compare the first voltage to the second voltage; and
the relative voltage signal is indicative of whether the first power rail or the second power rail has a higher voltage level.

6. The apparatus of claim 1, wherein the comparator comprises an analog comparator including a hysteresis filter configured to filter out high frequency voltage noise on at least one of the first power rail or the second power rail.

7. The apparatus of claim 1, wherein the power-multiplexer control circuitry includes power-multiplexer initiation circuitry configured to receive a voltage-level indication signal from a voltage controller and to generate the power-rail switching signal based on the voltage-level indication signal.

8. The apparatus of claim 7, wherein the voltage-level indication signal is indicative of the voltage controller issuing a command to change a second voltage level of the second voltage on the second power rail.

9. The apparatus of claim 8, wherein the voltage-level indication signal is indicative that the voltage controller is issuing the command to increase the second voltage level of the second voltage on the second power rail so as to be higher than a first voltage level of the first voltage on the first power rail.

10. The apparatus of claim 7, wherein:
the power-multiplexer initiation circuitry includes power-multiplexer triggering circuitry configured to generate at least one trigger signal based on the relative voltage signal from the comparator and the voltage-level indication signal from the voltage controller; and
the power-multiplexer initiation circuitry is configured to generate the power-rail switching signal based on the at least one trigger signal.

11. The apparatus of claim 10, wherein the at least one trigger signal is indicative that the second voltage is greater than the first voltage based on a voltage measurement made by the comparator and a command issued by the voltage controller.

12. The apparatus of claim 10, wherein the power-multiplexer initiation circuitry includes digital hysteresis circuitry configured to receive the at least one trigger signal and to delay forwarding of the at least one trigger signal until the at least one trigger signal has a constant logical value for a delay period.

13. The apparatus of claim 1, wherein a power-multiplexer tile of the multiple power-multiplexer tiles includes:
a first switching circuit coupled between the first power rail and the load power rail, the first switching circuit configured to disconnect the load power rail from the first power rail or to connect the load power rail to the first power rail responsive to the power-rail switching signal; and
a second switching circuit coupled between the second power rail and the load power rail, the second switching circuit configured to disconnect the load power rail from the second power rail or to connect the load power rail to the second power rail responsive to the power-rail switching signal.

14. The apparatus of claim 13, wherein:
the first switching circuit includes a first transistor coupled between the first power rail and the load power rail, the first transistor configured to be turned on or off responsive to the power-rail switching signal; and
the second switching circuit includes a second transistor coupled between the second power rail and the load power rail, the second transistor configured to be turned on or off responsive to the power-rail switching signal.

15. The apparatus of claim 13, wherein:
the first switching circuit includes a first big switch and a first little switch coupled between the first power rail and the load power rail;
the second switching circuit includes a second big switch and a second little switch coupled between the second power rail and the load power rail; and
the multiple power-multiplexer tiles are configured to function as a distributed power switch during a power-up sequence for a circuit load coupled to the load power rail by closing little switches in a first pass along the chained arrangement and closing big switches in a second pass along the chained arrangement.

16. An integrated circuit comprising:
a first power rail configured to be held at a first voltage;
a second power rail configured to be held at a second voltage;
a load power rail;
a circuit load coupled to the load power rail;
multiple power-multiplexer tiles coupled in series in a chained arrangement and configured to jointly perform a power-multiplexing operation responsive to a power-rail switching signal, each power multiplexer tile configured to switch between coupling the load power rail to the first power rail and coupling the load power rail to the second power rail; and
power-multiplexer control circuitry coupled to the first power rail and the second power rail, the power-multiplexer control circuitry including:
comparison means for producing a relative voltage signal based on the first voltage and the second voltage;
initiation means for generating the power-rail switching signal based on the relative voltage signal; and
signaling means for propagating the power-rail switching signal from one power-multiplexer tile of the multiple power-multiplexer tiles to a consecutive power-multiplexer tile along the chained arrangement such that the power multiplexing operation is performed sequentially along the chained arrangement.

17. The integrated circuit of claim 16, wherein the signaling means is distributed at least one of within or between individual ones of the multiple power-multiplexer tiles.

18. The integrated circuit of claim 16, wherein the power-multiplexer control circuitry includes tile control means for causing each power-multiplexer tile of the multiple power-multiplexer tiles to disconnect the load power rail from the first power rail and to connect the load power rail to the second power rail in one sequential pass along the chained arrangement, the tile control means distributed with each power-multiplexer tile of the multiple power-multiplexer tiles.

19. The integrated circuit of claim 16, wherein:
the initiation means includes triggering means for generating at least one trigger signal based on the relative voltage signal and a voltage-level indication signal; and
the initiation means is configured to generate the power-rail switching signal based on the at least one trigger signal.

20. The integrated circuit of claim 19, wherein the power-multiplexer control circuitry is configured to provide the power-rail switching signal to the multiple power-multiplexer tiles to initiate the power-multiplexing operation responsive to a second voltage level of the second voltage crossing a first voltage level of the first voltage while the second voltage is changing such that the multiple power-multiplexer tiles can perform the power-multiplexing operation while the second voltage level is substantially similar to the first voltage level.

21. The integrated circuit of claim 19, further comprising:
voltage control means for controlling multiple on-chip voltages, the voltage control means configured to provide the voltage-level indication signal responsive to issuing a command to change the second voltage on the second power rail.

22. A method for power multiplexing with an active load, the method comprising:
supplying power to a load power rail using a first power rail;
comparing a first voltage of the first power rail to a second voltage of a second power rail;
generating a relative voltage signal based on the comparing;
obtaining a voltage-level indication signal indicative of an issuance of a command to change the second voltage of the second power rail;
generating a power-rail switching signal based on the relative voltage signal and the voltage-level indication signal;
performing a power-multiplexing operation, including:
propagating the power-rail switching signal along a chained arrangement of multiple power-multiplexer tiles; and
at each power multiplexer tile,
disconnecting the load power rail from the first power rail responsive to receiving the power-rail switching signal; and
connecting the load power rail to the second power rail responsive to the receiving of the power-rail switching signal; and
supplying power to the load power rail using the second power rail.

23. The method of claim 22, wherein the generating the power-rail switching signal comprises:
determining that the relative voltage signal is indicative that the second voltage is greater than the first voltage; and
determining that the voltage-level indication signal is indicative of the issuance of the command to increase the second voltage above the first voltage.

24. The method of claim 22, further comprising filtering out noise that affects the first voltage or the second voltage.

25. The method of claim 22, further comprising during the performing of the power-multiplexing operation:
providing an oscillating clock signal to a circuit load coupled to the load power rail; and
continuing active operation of the circuit load responsive to the oscillating clock signal.

26. The method of claim 22, wherein the propagating of the power-rail switching signal along the chained arrangement of the multiple power-multiplexer tiles comprises:
propagating at least one trigger signal or at least one switch enable signal along the chained arrangement of the multiple power-multiplexer tiles.

27. The method of claim 22, wherein the disconnecting and the connecting are performed in a single sequential pass along the chained arrangement of the multiple power-multiplexer tiles.

28. An apparatus comprising:
a first power rail configured to be held at a first voltage;
a second power rail configured to be held at a second voltage;
a load power rail;
multiple power-multiplexer tiles coupled between the first power rail and the load power rail and between the second power rail and the load power rail, the multiple power-multiplexer tiles configured to switch between coupling the load power rail to the first power rail and coupling the load power rail to the second power rail based on a power-rail switching signal; and
power-multiplexer control circuitry coupled to the first power rail and the second power rail and configured to generate the power-rail switching signal based on at least one trigger signal, the power-multiplexer control circuitry including:
power-multiplexer triggering circuitry configured to generate the at least one trigger signal responsive to a second voltage level of the second voltage crossing a first voltage level of the first voltage,
a power-multiplexer tile of the multiple power-multiplexer tiles including:
at least one switching circuit coupled between the load power rail and both the first and second power rails; and
tile control circuitry configured to:
receive an incoming power-rail switching signal from a preceding power-multiplexer tile;
cause the at least one switching circuit to disconnect the load power rail from the first power rail responsive to receipt of the incoming power-rail switching signal;
cause the at least one switching circuit to connect the load power rail to the second power rail responsive to the receipt of the incoming power-rail switching signal; and
forward an outgoing power-rail switching signal to a succeeding power-multiplexer tile.

29. The apparatus of claim 28, further comprising:
a voltage controller configured to provide a voltage-level indication signal indicative of an issuance of a command to change the second voltage level of the second voltage on the second power rail, wherein
the power-multiplexer control circuitry includes a comparator configured to produce a relative voltage signal based on a comparison of the second voltage level to the first voltage level; and
the power-multiplexer triggering circuitry is configured to detect that the second voltage level crosses the first voltage level based on the voltage-level indication signal and the relative voltage signal.

30. The apparatus of claim 28, wherein:
the at least one switching circuit includes:
a first switching circuit coupled between the first power rail and the load power rail;
a second switching circuit coupled between the second power rail and the load power rail; and
the tile control circuitry is configured to:
cause the first switching circuit to disconnect the load power rail from the first power rail responsive to the receipt of the incoming power-rail switching signal; and
cause the second switching circuit to connect the load power rail to the second power rail responsive to the receipt of the incoming power-rail switching signal.

* * * * *